US005878327A

United States Patent [19]

Hayashi et al.

[11] Patent Number: 5,878,327

[45] Date of Patent: Mar. 2, 1999

[54] ANTENNA APPARATUS AND INFORMATION TRANSMITTING SYSTEM

[75] Inventors: Seiichi Hayashi, Mito; Susumu Kasai, Sagamihara; Masato Ishikawa, Hino, all of Japan

[73] Assignee: Hitachi Denshi Kabushiki Kaisha, Tokyo, Japan

[21] Appl. No.: 517,761

[22] Filed: Aug. 22, 1995

[30] Foreign Application Priority Data

| | | | |
|---|---|---|---|
| Aug. 23, 1994 | [JP] | Japan | 7-198713 |
| May 23, 1995 | [JP] | Japan | 7-123981 |
| May 23, 1995 | [JP] | Japan | 7-123982 |
| Jun. 12, 1995 | [JP] | Japan | 7-144645 |

[51] Int. Cl.[6] ................................ H04B 5/02; H04B 7/26

[52] U.S. Cl. ............................ 455/41; 455/517; 455/525; 455/562

[58] Field of Search ............................. 455/41, 422, 436, 455/437, 438, 439, 463, 507, 517, 524, 525, 67.1, 561, 562; 342/42, 44, 51, 359, 360, 361; 343/700 MS, 702, 724, 725, 729

[56] References Cited

U.S. PATENT DOCUMENTS

| | | | |
|---|---|---|---|
| 3,276,020 | 9/1966 | Maillet . | |
| 3,734,229 | 5/1973 | Comer . | |
| 3,914,476 | 10/1975 | Klensch . | |
| 4,912,471 | 3/1990 | Tyburski et al. | 455/41 |
| 5,349,631 | 9/1994 | Lee | 455/562 |

FOREIGN PATENT DOCUMENTS

| | | | |
|---|---|---|---|
| 2 607 326 | 5/1988 | France . | |
| 0021640 | 2/1985 | Japan | 455/41 |
| 0077408 | 7/1987 | Japan | 455/41 |
| A-63-92104 | 4/1988 | Japan . | |
| 2 106 357 | 4/1983 | United Kingdom . | |
| WO89/04568 | 5/1989 | WIPO | 455/41 |

OTHER PUBLICATIONS

"Current Plane Antenna Technique" Sogo Gijutsu Center Mar. 25, 1991 pp. 18–20, 401–408, Mar. 25, 1998.

"Radio Engineering Handbook" Ohm Sha K.K. Jan. 31, 1962, vol. 11, pp.580–581,Figure 90.

*Primary Examiner*—Thanh Cong Le

*Attorney, Agent, or Firm*—Antonelli, Terry, Stout & Kraus, LLP

[57] ABSTRACT

In an information transmitting system for radio-transmitting information between a fixed station and a mobile station moved within a predetermined moving range, an antenna apparatus is provided on the fixed station side. The antenna apparatus includes a large number of unit antennas, each of which functions as an antenna. These unit antennas are mutually connected to each other, and are arranged along the moving range of the mobile station. The information is transmitted/received in a radio transmission mode between the mobile station and the fixed station via an antenna of the fixed station and the antenna apparatus.

31 Claims, 32 Drawing Sheets

ANTENNA APPARATUS AND INFORMATION TRANSMITTING SYSTEM

BACKGROUND OF THE INVENTION

The present invention relates to an antenna apparatus and an information transmitting system with using this antenna apparatus capable of effectively receiving such information as video (picture) information and audio (voice) information transmitted under low power or very low power is radio (wireless) signal forms from such moving objects as a self-drive robot traveled on a rail or a limited range, an automobile, a car to an elevator, and a train.

In general, when video signal is transmitted/received between a moving object and a fixed station, a large-scaled antennas are installed on the respective units, the video information is transmitted by using public-allowed relatively strong electromagnetic waves in a specific frequency. For instance, JP-A-63-92104 (publication No. 1) discloses one of the conventional plane antenna. That is, only when the moving object has passed such a range covered by the signal projected from the plane antenna, this moving object may receive the information from the plane antenna.

Another conventional plane antenna is disclosed in “Current Plane Antenna Technique” (publication No. 2) issued by SOGO GIJUTSU CENTER K.K. on Mar. 25, 1991, on pages 18 to 20 and 401 to 408, and further “Radio Engineering Handbook” (publication No. 3) issued by Ohm Sha K. K. on Jan. 31, 1962, vol. 11, on pages 580 to 581, FIG. 90.

SUMMARY OF THE INVENTION

In the above-described publication No. 1, the information could not receive from the plane antenna only when the moving object is located at a specific position, but also this information could not receive from the plane over the moving range of the moving object.

The publication No. 2 represents in FIGS. 1.9 and 6.29 such a plane antenna that a plurality of plane antenna elements are coupled to form this plane antenna. These plane antennas are directed to transmit/receive the radio information between the antennas and the moving object moved far from the antenna, but not directed to transmit/receive the radio information between the antennas and the moving object traveled near the antennas. Similarly, the plane antenna shown in the publication No. 3 owns the similar problems.

To transmit information between an elevator car and a rail along which this elevator car is traveled, electromagnetic couplings are utilized. Since power used in the electromagnetic coupling is very low, the elevator is located very close (for instance, on the order of ten mm) to the rail under a line-shaped coupling. Thus, the application range is limited.

In the above-described technique for radio-transmitting the information with the relatively strong electromagnetic waves by using the large-scaled antenna, in the case that the picture (video) information is transmitted/received between the child station (will be referred to a “mobile station” hereinafter) by the moving object and the fixed station, the antenna power at the mobile station is increased so as to obtain the picture information with the broad bandwidth under better quality. Accordingly, the output power of the transmitter is increased. Also, to increase the antenna gain, the antenna apparatus provided on the fixed station is, for instance, a parabola antenna and a YAGI antenna, which are large-sized antennas. Moreover, there is another drawback that the mobile station apparatus and also the antenna of the fixed station are high cost. Since the large-scale receiving antenna is required for the fixed station, there is a further drawback in installation of such a large-scale receiving antenna. When the output power from the transmitter antenna is high, there are practical drawbacks such that interference occurs with respect to other picture information transmitting systems, and the usable frequency is limited.

There are further practical drawbacks that when the picture information is transmitted between the transmitter antenna and the receiver antenna, various standing waves and phase shifts are produced due to multipath of the transmitted signals, the fading phenomenon occurs, the signal disturbances are produced, and the S/N ratio is deteriorated, resulting in lowering of image quality.

Also, it is very difficult to obtain information with constant quality while continuously positioning the antenna of the mobile station opposite to the antenna of the fixed station, because of directivity of the antennas.

In particular, when the travel direction of the mobile station is directed to various directions, the antenna of the mobile station is not always positioned opposite to the fixed station, and it is very difficult to maintain the picture information transmission under better quality.

When the electromagnetic waves are receive by a plurality of antenna elements on the side of the fixed station, since there are a phase difference and an output difference of wave propagations among the respective antenna elements, it is practically difficult to continuously obtain information higher than a predetermined level while the mobile station is traveled.

An aim of the present invention is to solve the various problems of the above-described prior art, and to provide an information transmitting system capable of radio-transmitting information between a mobile station and a fixed station with using very low power. In the information transmitting system, even when various standing waves are produced due to multipath of propagated waves, a fading phenomenon, a phase shift, a signal disturbance, and deterioration in S/N ratio can be reduced to negligible small values, so that deterioration in quality of the information to be transmitted can be prevented.

Another aim of the present invention is to provide an antenna apparatus capable of continuously transmitting information having a level higher than a preselected level irrelevant to a travel direction of a mobile station.

According to one aspect of the present invention, such an information transmitting system is provided which is comprised of a mobile station moved within a predetermined moving range; an antenna apparatus including a large number of unit antennas which each functions as an antenna, are mutually connected to each other, and are arranged along the moving range of the mobile station; and a fixed station connected to the antenna apparatus, for transmitting/receiving information via the antenna apparatus by way of a radio transmission between the mobile station and the fixed station.

As described above, according to the present invention, since a large number of unit antennas for constituting the antenna apparatus are arranged along the moving range of the mobile station, the fixed station can receive the information from the mobile station over the moving range of the mobile station.

As an example, the above-described mobile station includes an antenna for radio-transmitting information between the antenna apparatus and the mobile station; and a distance between the antenna of the mobile station and the antenna apparatus is shorter than, or equal to 5λ (symbol "λ" being a wavelength of an electromagnetic wave used to radio-transmit information).

Since the antenna of the mobile station is positioned close to the antenna apparatus of the fixed station, the information having the quality higher than a predetermined level can be continuously transmitted under very low power between the mobile station and the fixed station.

Various problems such that various standing waves are produced by multipath of transmitted waves, the fading phenomenon occurs, the phase shifts and the signal disturbances are produced, and also the S/N ratio is deteriorated can be reduced to negligible small values, and deterioration in quality of information to be transmitted can be prevented.

According to another aspect of the present invention, such a bidirectional communication information transmitting system is provided which is comprised of: a mobile station moved within a predetermined moving range, including a first transmitter, a first receiver, and antenna means connected to the first transmitter and the first receiver, for transmitting/receiving information between a fixed station and the mobile station; an antenna apparatus including a large number of unit antennas which each functions as an antenna, are mutually connected to each other, and are arranged along the moving range of the mobile station; and a fixed station connected to the antenna apparatus, for transmitting/receiving information via the antenna apparatus by way of a radio transmission between the mobile station and the fixed station; wherein: the fixed station includes a second receiver for receiving the information from the antenna means of the mobile station, and a second transmitter for transmitting the information to the mobile station by way of the radio transmission.

In an example, the above-described mobile station includes a picture information output apparatus for outputting picture (video) information as the information; the mobile station radio-transmits the picture information derived from the picture information output apparatus from the first transmitter via the antenna unit; and the second receiver of the fixed station receives the picture information via the antenna apparatus.

According to a further aspect of the present invention, an antenna apparatus is provided which is comprised of a plurality of antenna unit groups, such as first, second, third and forth antenna unit group, for instance; each of which is formed by a plurality of unit antenna units; wherein each of the unit antenna units is constructed of at least one unit antenna, such as one unit antenna or two unit antennas combined, for example; the antenna unit groups are arranged at sequential order such as shown in FIG. 19, wherein the unit antenna shown in FIG. 19 is illustrated as the representative one; the unit antennas belonging the one antenna unit groups, such as first and third groups, are so arranged that the shapes of electromagnetic waves irradiated from all the unit antennas therein are the same; and the unit antennas belonging the other antenna unit groups, such as second and forth groups, are so arranged that the shapes of electromagnetic waves irradiated therefrom are different from one of the unit antennas in the groups such as the first and the third groups; and the unit antennas belonging the same groups are commonly connected to each other, that is the unit antennas in the first and third groups are commonly connected to each other, as well as in the second and forth groups.

It should be understood that a shape of electromagnetic wave radiation implies both of a propagation plane and directivity about vertical/horizontal polarization of the electromagnetic wave.

As described above, since the unit antennas having the different shapes of wave radiation are alternately arranged, even when the wave receiving direction is varied, the polarized plane of the received wave is continuously located opposite to directivity of any one of these unit antenna groups of the antenna apparatus. Accordingly, the information with better quality can be continuously received.

When such an antenna apparatus is arranged along the travel surface of the information transmitting system, even if the mobile station is not traveled in parallel to the longitudinal direction of the travel surface, the antenna of the mobile station is always positioned opposite to any one of these unit antenna group employed in the antenna apparatus. As a consequence, the fixed station can continuously receive the information with better quality irrelevant to the travel directions of the mobile station.

In the above-described fixed station, it is possible to employ a group selecting circuit connected to a plurality of unit antenna unit groups of the antenna apparatus, for comparing information outputs with each other received from the plurality of unit antenna unit groups of the antenna apparatus, transmitted from the transmitter, whereby the group selecting circuit selects the information output of the unit antenna unit group having the highest reception output; and a receiver for receiving the selection output from the group selecting circuit.

As described above, the large output of the unit antenna unit group is selected from the plurality of unit antenna unit groups to be supplied to the receiver, so that the fixed station can continuously receive the information with other quality.

Furthermore, according to another aspect of the present invention, such an information transmitting system is provided which is comprised of: a mobile station moved within a predetermined moving range; an antenna apparatus including a large number of unit antennas which each functions as an antenna, are mutually connected to each other, and are arranged along the moving range of the mobile station; and a fixed station connected to the antenna apparatus, for transmitting/receiving information via the antenna apparatus by way of a radio transmission between the mobile station and the fixed station; the antenna apparatus is provided which is comprised of a plurality of antenna unit groups, such as first, second, third and forth antenna unit group, for instance; each of which is formed by a plurality of unit antenna units; wherein each of the unit antenna units is constructed of at least one unit antenna, such as one unit antenna or two unit antennas combined, for example; the antenna unit groups are arranged at sequential order such as shown in FIG. 19, wherein the unit antenna shown in FIG. 19 is illustrated as the representative one; the unit antennas belonging the one antenna unit groups, such as first and third groups, are so arranged that the shapes of electromagnetic waves irradiated from all the unit antennas therein are the same; and the unit antennas belonging the other antenna unit groups, such as second and forth groups, are so arranged that the shapes of electromagnetic waves irradiated therefrom are different from one of the unit antennas in the groups such as the first and the third groups; and the unit antennas belonging the same groups are commonly connected to each other, that is the unit antennas in the first and third groups are commonly connected to each other, as well as in the second and forth groups.

As previously explained, since the electromagnetic wave transmitted from the mobile station is received by at least two unit antenna unit groups having the different phases, the fixed station can continuously receive the information with better quality irrelevant to the travel directions of the mobile station. In particular, since the electromagnetic waves received by the same antenna groups contain the essentially in-phase components as the major components, the reception outputs of this unit antenna unit group are added to each other so as to be emphasized. Therefore, the information with better quality can be continuously received.

Preferably, the above-described fixed station includes: a group selecting circuit connected to a plurality of unit antenna unit groups of said antenna apparatus, for comparing information outputs with each other received from said plurality of unit antenna unit groups of said antenna apparatus, transmitted from said transmitter, whereby said group selecting circuit selects the information output of the unit antenna unit group having the highest reception output; and a receiver for receiving the selection output from said group selecting circuit.

DESCRIPTION OF THE PREFERRED EMBODIMENTS

Figure 1:
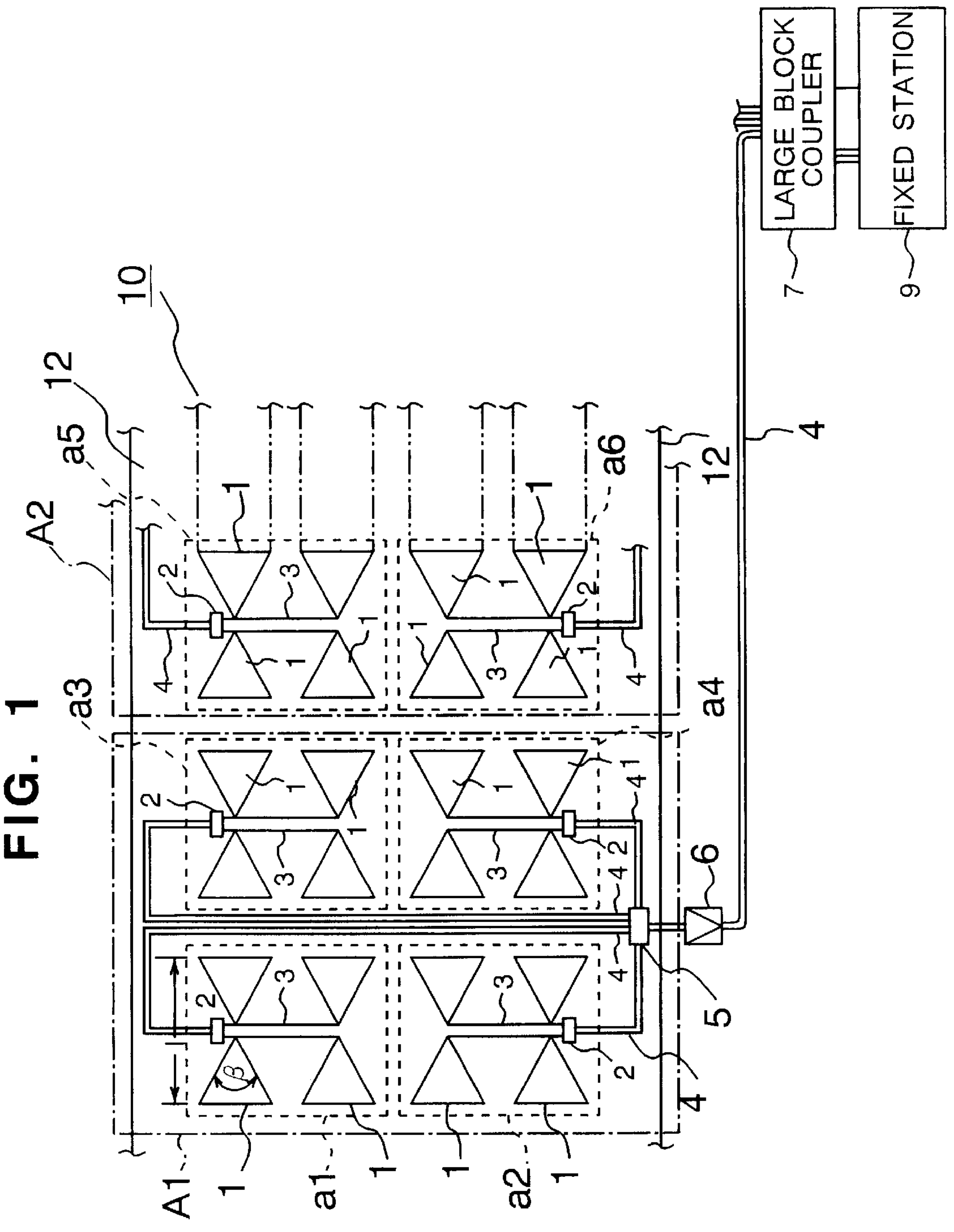
FIG. 1 is a plan view for showing one example a plane multi-antenna provided on a side of a fixed station employed in an information transmitting system according to one embodiment of the present invention.

Referring now to the accompanying drawings, a detailed description will be made of an antenna apparatus and an information transmitting system with employment of this antenna apparatus, according to an embodiment of the present invention. It should be noted that the same reference numerals are employed so as to denote the elements having the same functions, and explanations thereof are omitted.

FIG. 1 is a plan view for showing a plane multi-antenna (antenna apparatus) employed in an information transmitting system according to an embodiment of the present invention. That is, the plane multi-antenna is so constructed that a large number of plate-shaped plane unit antenna (namely, an antenna element functioning as an independent antenna, for instance, a dipole antenna will be referred to a "unit antenna") provided on a fixed station are arranged along a travel (moving) range of a moving object, and these plane unit antennas are coupled to each other in an integral form. A plane unit antenna per se is described in the above-described publication (2), i.e., well known in the art.

It should be understood that a "plane antenna" defined in the present invention implies such an antenna that plane elements for constituting this antenna are arranged in a plane manner. That is, this plane antenna need not be made precisely flat, but may be made slightly curved, or waved.

Figure 2:
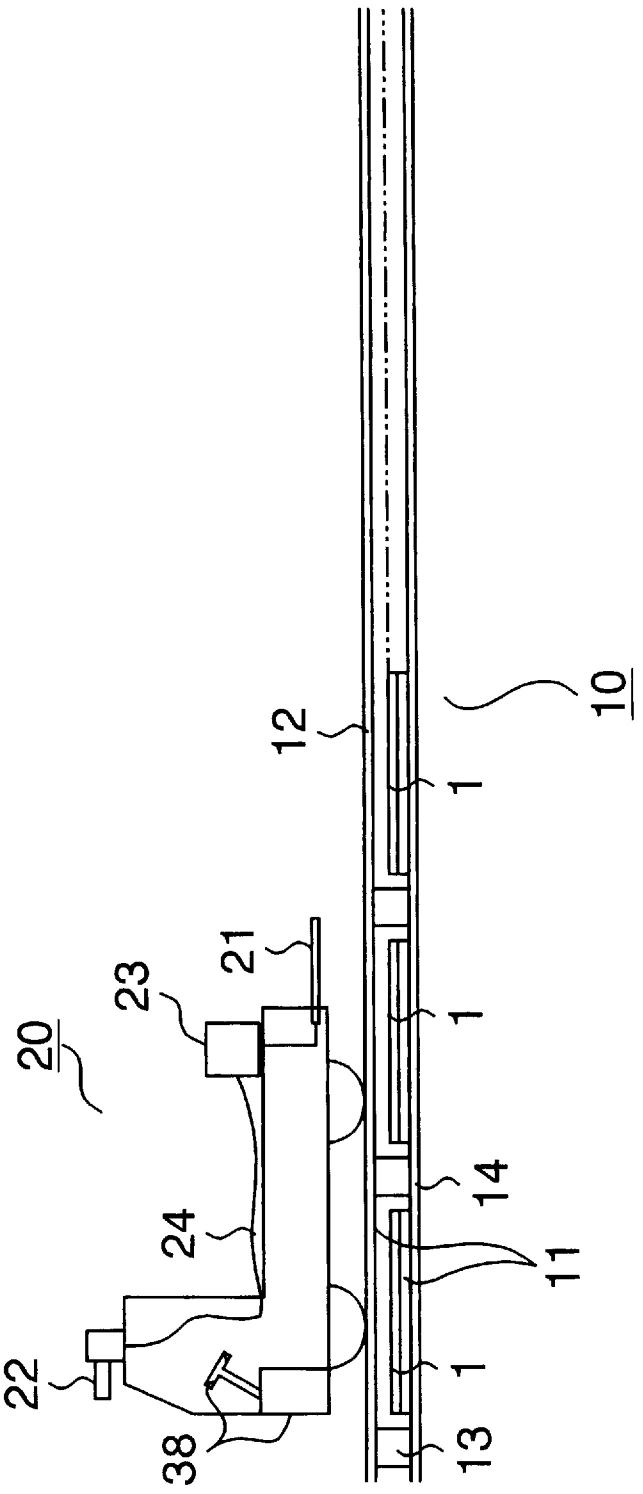
FIG. 2 is a side view for indicating a positional relationship between an antenna of a mobile station and the plane multi-antenna provided on the fixed station side in the information transmitting system according to the embodiment of the present invention.

FIG. 2 is a side view for illustrating a positional relationship between an antenna of a moving object station (mobile station) and a multi-antenna constructed of a plurality of plane unit antennas.

Figure 3:
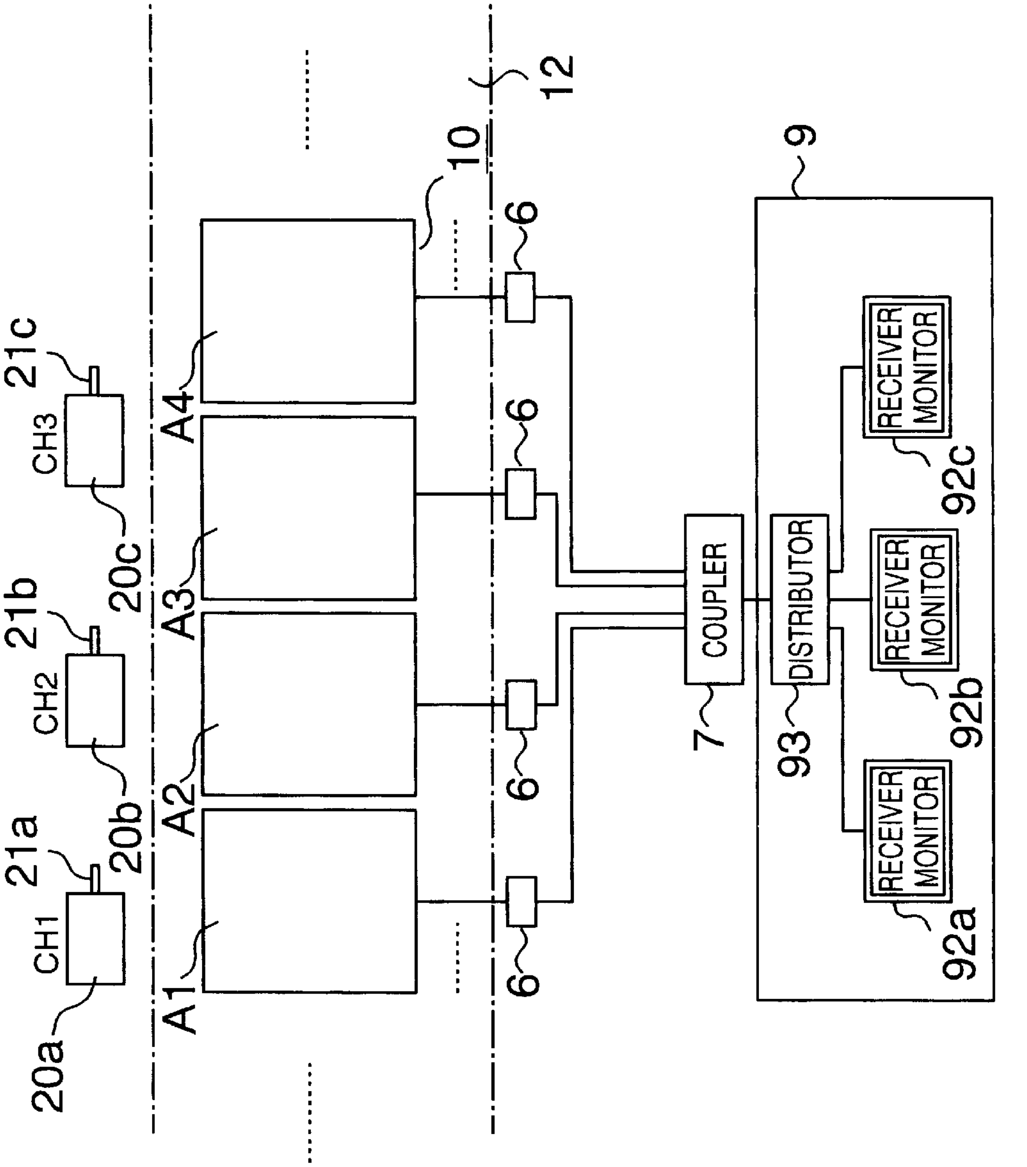
FIG. 3 is a schematic block diagram for indicating an overall arrangement of the information transmitting system according to the embodiment of the present invention.

FIG. 3 is a schematic block diagram for indicating an overall system arrangement of the information transmitting system according to an embodiment of the present invention.

In FIG. 1, reference numeral 1 indicates a flat plane unit antenna, for example, a dipole antenna. Reference numeral 2 is a matching device such as a matching transformer used to achieve an impedance matching. Reference numeral 3 shows a feeder for connecting the plane unit antenna 1 to the matching device 2. A small block is arranged by, for instance, two sets of plane unit antennas 1, the matching device 2 and the feeder 3. Reference numeral 4 is a coaxial cable. Reference numeral 5 shows a small block coupling device constructed of a transformer used to couple a plurality of small blocks, e.g., four blocks a1, a2, a3, a4. Further, reference numeral 6 denotes an amplifier connected to the coupling device 5. As described above, for example, a plurality of large blocks "A (A1, A2, - - - ,)" are constructed by the four small blocks "a". Further, all of the large blocks A1, A2, - - - , are combined with each other by a large block coupling device 7, and the combined large blocks are connected to a fixed station 9.

Thus, a plane multi-antenna 10 is arranged in such a manner that a large number of plane unit antennas 1 are arranged to be mutually coupled with each other in a plane manner.

In this embodiment, the plane unit antenna 1 has a triangle shape as shown in the drawing. This is the generic shape of the well-known fan-shaped antenna having a dimension "l" being nearly equal to ($\lambda$/6) to $\lambda$ (symbol "$\lambda$" denotes a wavelength of a radio transmission signal) and an angle "$\theta$" being nearly equal to 30 to 90 degrees. Such a fan-shaped antenna is described in, for example, the above-described publication No. 3. A frequency of a carrier wave of this information transmission signal is selected to be approximately 100 MHz to 10 GHz. This condition when the triangle-shaped plane unit antenna is employed is similarly used in the following embodiment.

In FIG. 2, the plane unit antennas 1 are arranged with a predetermined interval on a shield setting plate 14. Each interval is constructed of either space, or a dielectric substance 11. The shield plane 14 reduces external noise, and also effectively functions as a means for emphasizing field strengths with respect to the travel surface.

Reference numeral 12 shows a travel plate for constituting the travel surface along which a mobile station 20 is traveled. Reference numeral 13 indicates a pacer for holding the travel plate 12 and the shielding round plate with keeping a constant interval.

Alternatively, the dielectric substance 11 may be employed between the plane unit antenna 1 and the shielding ground plate 14, and between the travel plates 12. A mobile antenna 21 is provided on the mobile station 20 in such a manner that this mobile antenna 21 is located near the plane multi-antenna 10. As an example of the mobile antenna 21, a simple rod-shaped antenna (containing a rod antenna) is illustrated. It should be noted in this example that the moving object corresponds to a remote-controlled no-man self-driving car, and a picture (video information) of a television camera mounted on this self-driving car can b observed by the fixed station.

Reference numeral 22 is a television camera, and reference numeral 23 shows a transmitter. A picture imaged by the television camera 22 is transferred via a signal line 24 to the transmitter 23 so as to be frequency-modulated (FM), for instance. The FM signal is outputted via the mobile antenna 21. Reference numeral 38 shows a drive operation apparatus of the mobile station.

It should be noted that materials of these antenna and shielding ground plate are metal materials, for instance, copper, aluminum, iron plates or meshes. Both of the travel plate and the dielectric substance are non-metal materials, for example, ceramics, plastics, fiber plates, or meshes. As a typical example of plastic, a polyester film and an expanded foam are involved.

The plane multi-antenna is preferably constructed as an integral body by sandwiching the travel plate, the plane multi-antenna, and the shielding ground plate with the dielectric substance. Furthermore, the plane antenna is constructed of at least a flexible material, so that this flexible plane antenna may be transported to any places, stored and installed therein.

With the above-described arrangement, other than the picture (video) information, for example, audio (voice)

information acquired by a microphone (not shown), and positional data of a GPS (Global Positioning System by Satellite) signal may be transmitted from the transmitter 23 of the mobile station. Also, a video reproducing apparatus such as a VTR is employed instead of the television camera, and video information derived from the video reproducing apparatus may be transmitted.

As previously described, FIG. 3 shows a system arrangement of this embodiment.

As illustrated in this drawing, normally, there are plural mobile stations 20. In this case, there are three mobile stations 20*a*, 20*b*, 20*c*, which transmit the above-described picture signal by carrier frequencies of a channel 1, a channel 2, and a channel 3. Reference numerals 21*a*, 21*b*, 21*c* indicate antennas of the mobile stations 20*a*, 20*b*, 20*c*, respectively.

The fixed station 9 is arranged by a distributor 93 and three sets of receiver monitors 92*a*, 92*b*, 92*c* for the channels 1 to 3. A signal supplied from the mobile stations 20*a*, 20*b*, 20*c* via the multi-antenna 10 and the coupler 7 is distributed by the distributor 93 to the respective receiver monitors 92*a*, 92*b*, 92*c*. In each of these receiver monitors, a desired channel is selected to demodulate the transmitted signal, so that a picture of this transmitted signal may be obtained.

Figure 4:
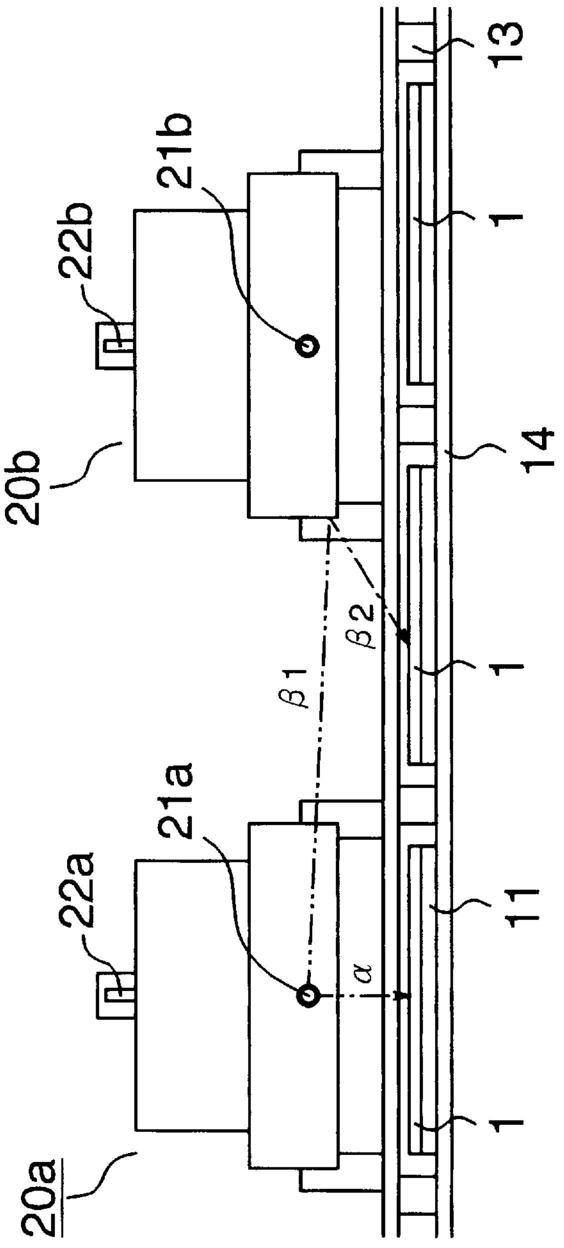
FIG. 4 explanatorily shows a path of a radio transmitted signal between the antenna of the mobile station and the plane multi-antenna of the fixed station side in the embodiment of FIG. 3.

FIG. 4 explanatorily shows a signal path of a radio signal transmitted between an antenna of a mobile station and a plane multi-antenna.

In this drawing, there are represented a signal path "$\alpha$" and signal paths "$\beta1$" and "$\beta2$" in such an arrangement that an antenna 21 of a mobile station is positioned close to a plane multi-antenna 10. Along the signal path $\alpha$, an output from an antenna 21*a* of a mobile station 20*a* is directly radio-transmitted to the multi-antenna 10. Along the signal paths $\beta1$ and $\beta2$, the output from the antenna 21*a* is reflected from side walls of the surroundings and the disturbances, i.e., reflected antenna outputs from another mobile station 20*b* in this drawing.

In this drawings, reference numerals 22*a* and 22*b* designate television cameras, and 21*b* an antenna.

This indicates that there are a plurality of radio transmission paths from the antenna 21*a* to the plane antenna 10. This implies that multi-path problems occur.

As a consequence, to prevent the multipath problems, a distance $\alpha$ of the signal path must become $\alpha<\beta1+\beta2$.

To this end, for instance, the signal path a along which the antenna output is directly radio-transmitted may preferably set in such a manner that this path $\alpha$ should be shorter than, or equal to a constant value with respect to a wavelength "$\lambda$" of a radio-transmitted signal frequency, namely $0\leqq\alpha\leqq5\lambda$, preferably $0<\alpha\leqq2\lambda$ more preferably $\alpha\leqq2$, and $\alpha\leqq\lambda/2$ as an optimum value. This condition is similarly applied to the respective embodiments.

That is, the antenna of the mobile station and the plane multi-antenna are closely positioned so as to satisfy the above-described value, so that information is radio-transmitted between these antennas. As a result, when the picture information is transmitted between the transmitter antenna and the receiver antenna, since the shortmost signal path located at the nearest position between the transmitter antenna and the receiver antenna is stronger than other multi-path signal paths, it is possible to relatively neglect the multipath caused by the reflections of the transmitted/propagated signals, occurrences of standing waves, phase shifts, fading phenomena, disturbances of signals, and deterioration of S/N (signal-to-noise). The levels of the image quality can be maintained, so that such picture information with better quality and wide bandwidth may be obtained irrelevant to the positions of the moving object.

It should be noted that when the antenna of the mobile station is located extremely close to the plane multi-antenna, the reception signal is adversely influenced by variations in the field intensity distribution at the boundaries among the adjoining unit antennas along the travel direction of the mobile station. To avoid such an adverse influence, the interval may be selected to have such a value as $\alpha>\lambda/50$, taking account of expansion of directivity of the field intensity distribution. This interval is similarly applied to the below-mentioned various embodiments.

It should also be noted that the bandwidths of the picture information transmissions with respect to the carrier wave of the picture information transmission frequency are different from each other, depending upon the modulation methods. When the frequency modulation (FM) is employed, the wider the bandwidth becomes, the better the signal-to-noise ratio becomes, so that more effective picture information transmission can be achieved with respect to the surrounding noise. As a consequence, in the case of FM modulation, for instance, the bandwidth of the signal transmission is preferably selected to be wider than approximately 6 MHz.

It should be understood that since the transmitter antenna is located close to the receiver antenna, the transmission power may become very low. For example, the field strength of the transmission station may be set to be lower than, or equal to 500 $\mu$V/m under a distance of 3 m. This condition may be similarly applied to the following respective embodiments.

Figure 5:
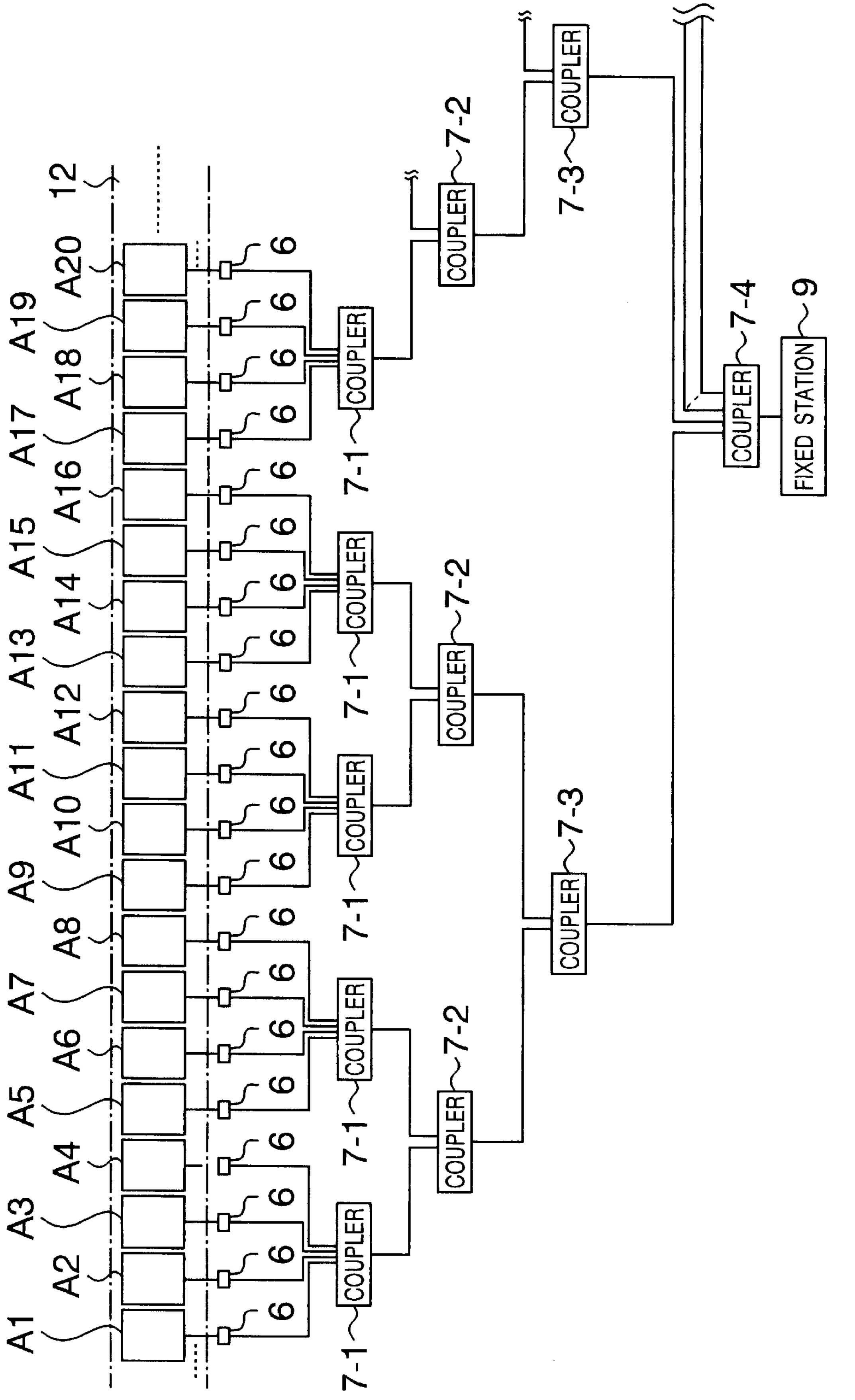
FIG. 5 is a plane view for showing another example of the plane multi-antenna provided on the fixed station side in the information transmitting system according to the embodiment of the present invention.
Figure 6:
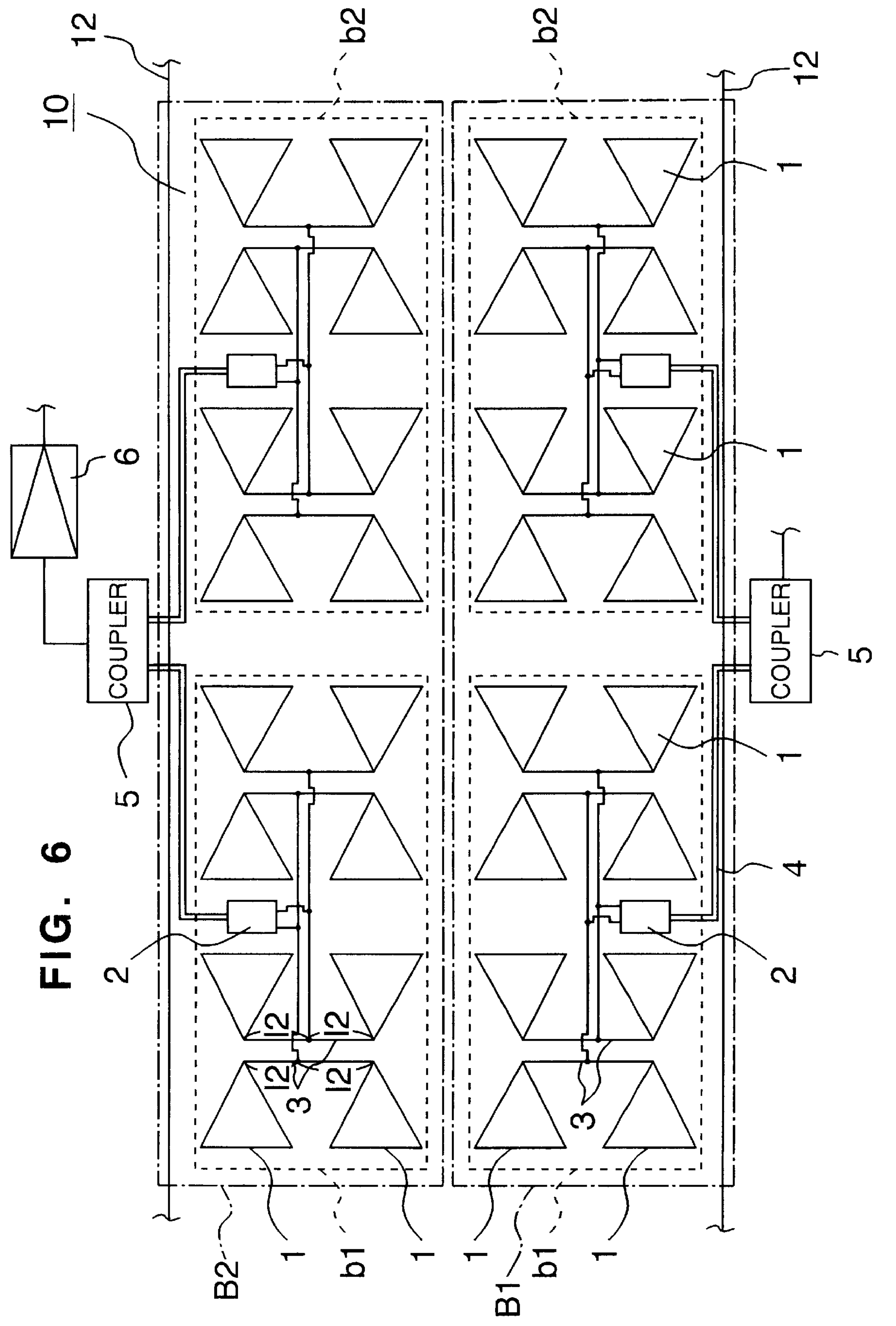
FIG. 6 is a plane view for showing another example of the plane multi-antenna provided on the fixed station side in the information transmitting system according to the embodiment of the present invention.
Figure 7:
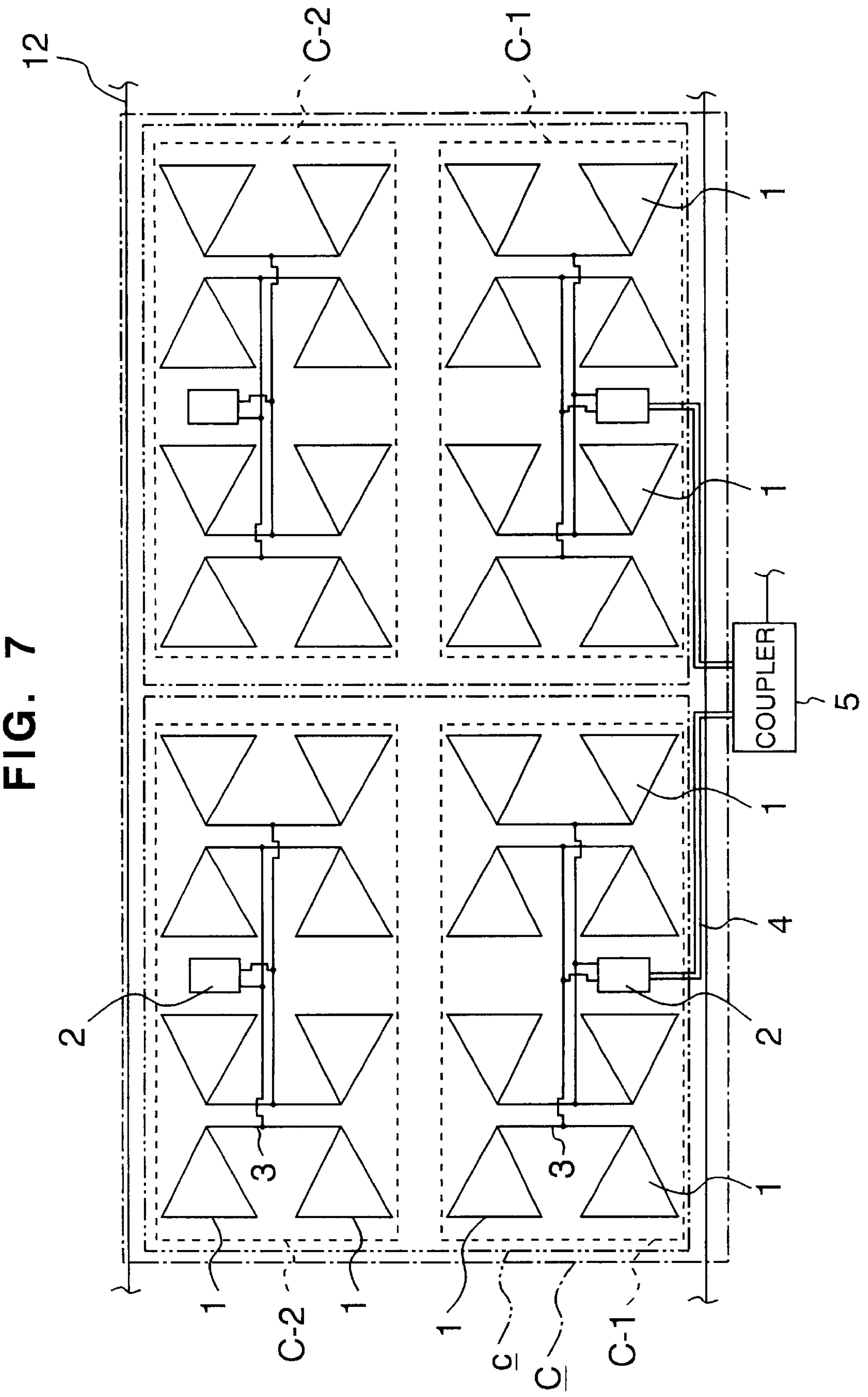
FIG. 7 is a plane view for showing another example of the plane multi-antenna provided on the fixed station side in the information transmitting system according to the embodiment of the present invention.

Referring now to FIG. 5 to FIG. 7, another example of an arrangement to combine the plane unit antennas with each other in accordance with this embodiment will be explained.

Plane multi-antennas shown in FIG. 5 are arranged in such a manner that when a travel surface is extended along a long distance, a plurality of large blocks, for instance, four large blocks A1 to A4 for the multi-antennas as shown in FIG. 1 to FIG. 3 are set to one small group, and then a plurality of such small groups (A1 to A4, A5 to A8, A9 to A12, A13 to A16, A17 to A20, - - - ) are arranged along the travel surface. The respective small groups are combined with each other via an amplifier 6 by a coupler 7-1. Further, a plurality (e.g., two) of small groups located adjacent to each other are combined with each other by a coupler 7-2 to become a middle group. In addition, a plurality (two) of middle groups located adjacent to each other are combined with each other by a coupler 7-3 to become a large group. Then, all of these large groups are combined with each other by a coupler 7-4 to be connected to the fixed station 9. Although the multi-antenna groups of FIG. 5 are constructed by the four-staged layer, this is one of typical examples. Therefore, the stage number of the antenna groups may be selected to be a proper value, depending upon the scales of the plane multi-antenna.

It should be noted that when the travel surface is made circular, the first large block (e.g., A1) in a large number of large blocks may be connected to the last large block (e.g., An), so that the large block is connected in an endless form.

FIG. 6 shows such another arrangement for a plan view of plane unit antennas. That is, four sets of plane unit antennas are set to constitute a single small block "b" (b1, b2, - - - ), and two small blocks are connected to each other by way of a coupler 5 to constitute a large block "B" (B1, B2, - - - ). In this drawing, the same reference numerals shown in FIG. 1 represent the same components. It is widely known in the art that since the line lengths "l2" from the branch point 3 of the feeder to the respective antenna elements are equal to each other in this small block, the wider bandwidth of the picture information transmission frequency can be covered, as compared with the small block "a" of FIG. 1. In case of this embodiment, it is practically possible to cover the frequency bandwidth equal to a half of the carrier frequency.

With such an arrangement, the plane multi-antenna may be constructed by coupling n (symbol "n" being an integer greater than, or equal to 2) pieces of small blocks "b", and by further coupling these small blocks "b" with m (symbol "m" being an integer larger than, or equal to 2) pieces of blocks "B", if necessary.

Since the plane multi-antenna owns such a structure, a plurality of plane unit antennas are formed in the block unit. The resultant plane unit antenna blocks are successively expanded so that the plane multi-antenna having various shapes can be arranged. Thus, the system may be easily extended.

FIG. 7 is a plan view for indicating another constructive example of the plane multi-antenna.

In this drawing, a small block "c" is arranged by a small block antenna unit c-1 (same as the small block "b" of FIG. 6) made of four unit antennas 1 connected to a coupler 5, and another small block antenna unit c-2 made of four unit antennas 1 not connected to the coupler 5. A large block C is constructed by combining such small blocks "c", for instance, two small blocks c-1 and c-2 with the coupler 5.

Even when the small block unit c-1 is positioned opposite to the small block unit c-2 and this small block unit c-2 is not connected to the coupler 5 but opened, the electromagnetic waves are reflected and emphasized by the effects of the plane unit antenna, so that the actual effective area of the plane unit antenna can be enlarged and thus be constituted at low cost. Since a total number of wiring connections i the example of FIG. 7 is smaller than that of the example shown in FIG. 6, the plane antenna may be readily extended.

Figure 8:
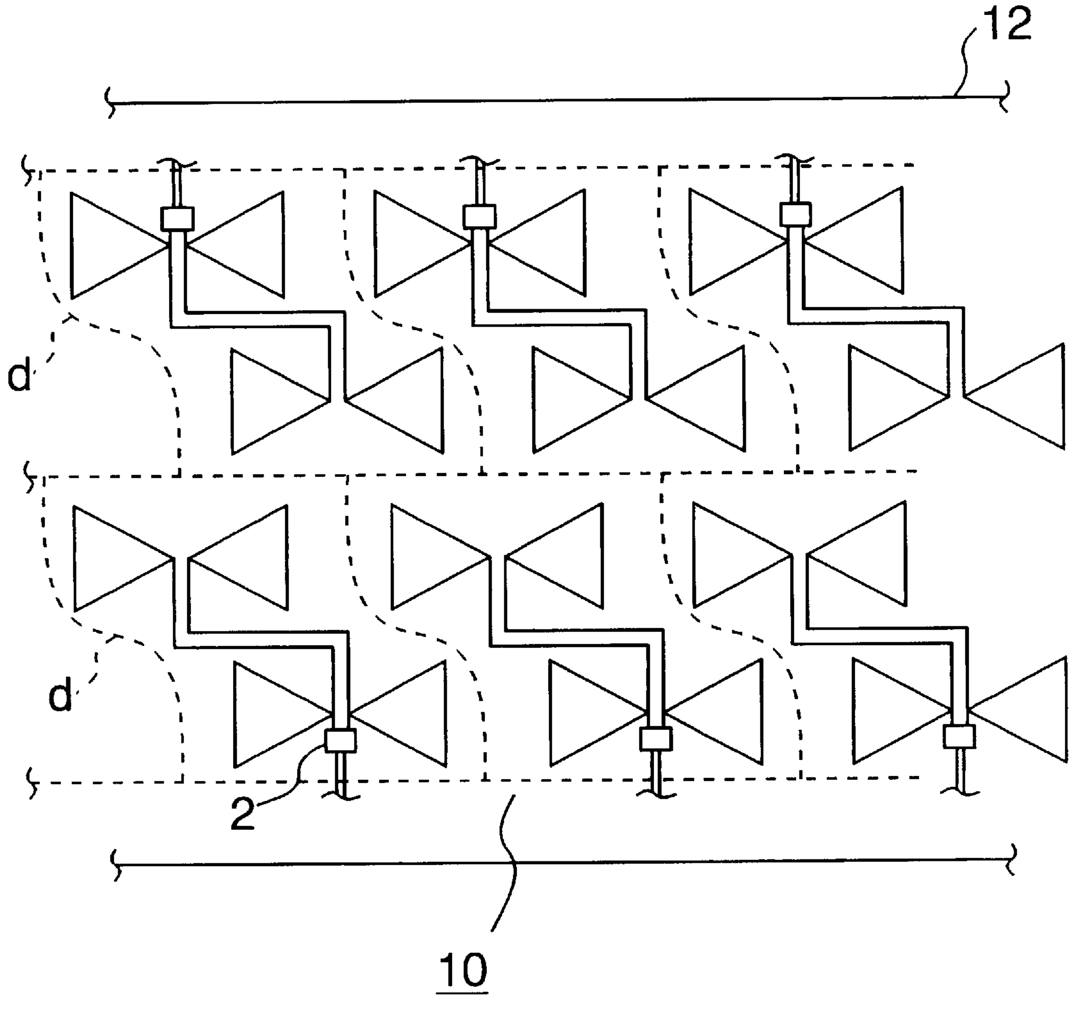
FIG. 8 is a plane view for indicating a further example of the plane multi-antenna provided on the fixed station side in the information transmitting system according to the embodiment of the present invention.
Figure 9:
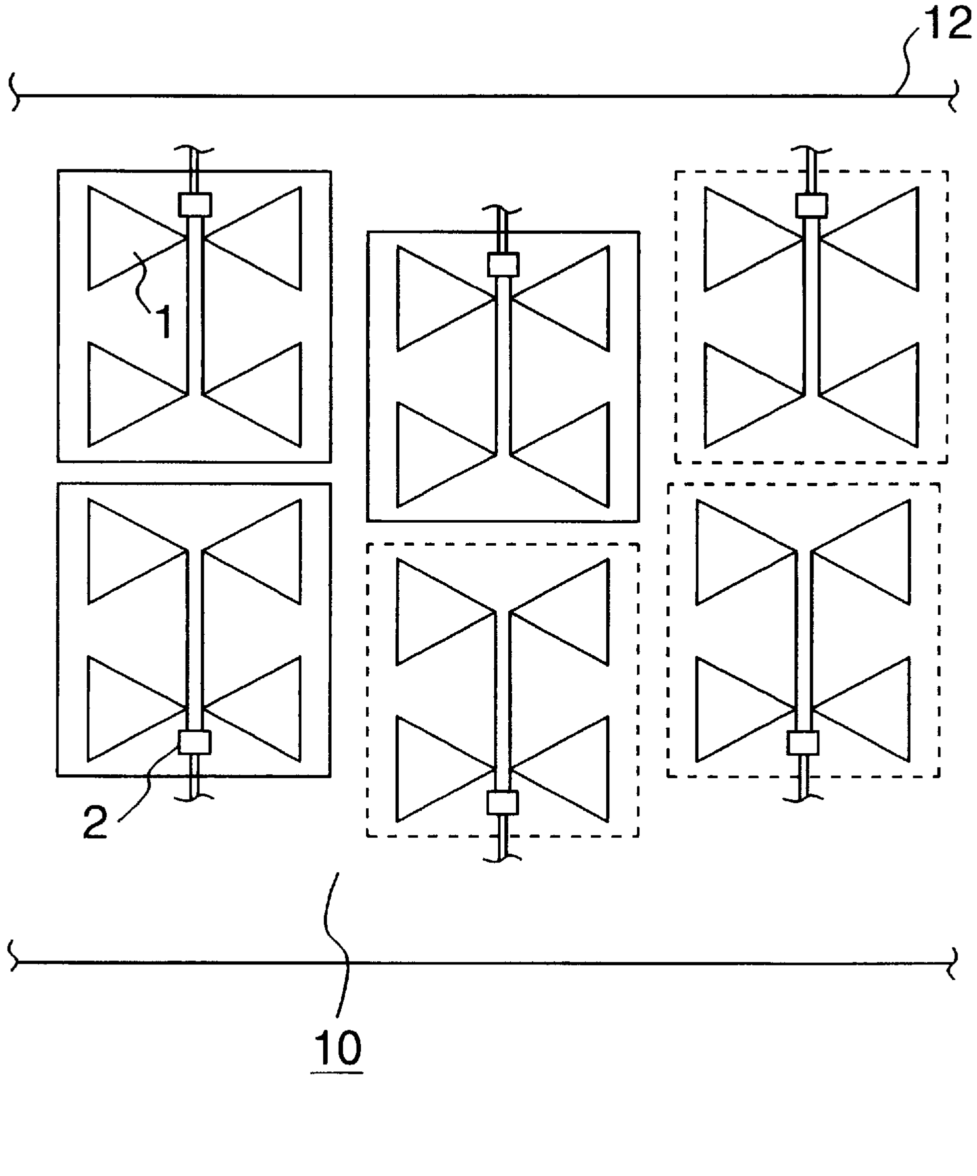
FIG. 9 is a plane view for indicating a still further example of the plane multi-antenna provided on the fixed station side in the information transmitting system according to the embodiment of the present invention.

FIG. 8 represents such a structure that two plane unit antennas 1 for constituting the small block "d" are mutually shifted along the longitudinal direction of the travel surface, and the unit antennas are arranged in a zig-zag form as an overall multi-antenna. In FIG. 9, there is shown an example of such an antenna arrangement that the respective block antennas are mutually shifted in a zig-zag form along a direction perpendicular to the longitudinal direction of the travel surface. As illustrated in the antenna structures of FIG. 8 and FIG. 9, when the unit antennas are arranged in a zig-zag form, the following advantages may be achieved, as compared with the antenna structure in which the unit antennas are not arranged in a zig-zag form (see FIGS. 1, 6 and 7). That is, the zig-zag formed antenna structure can reduce the low field intensity locations caused by directivity of the antennas existing in the intervals of the respective plane unit antennas, so that differences in the strengths of the directivity can be mitigated.

It should be noted that each of the multi-antennas shown in FIG. 6 to FIG. 9 may be structured by such a hierarchical structure of groups as illustrated in FIG. 5.

Figure 10:
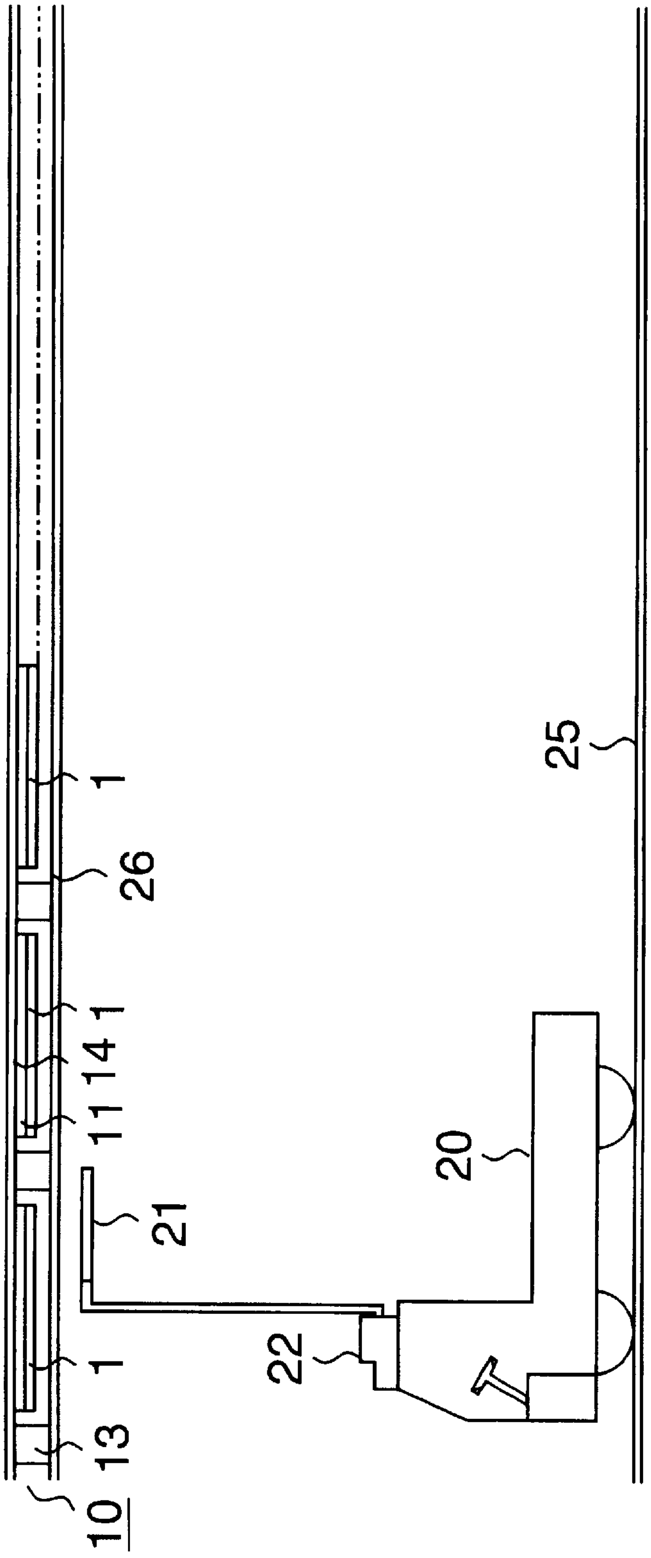
FIG. 10 is a side view for representing another arranging example of the plane multi-antenna in the information transmitting system according to the embodiment of the present invention.
Figure 11A:
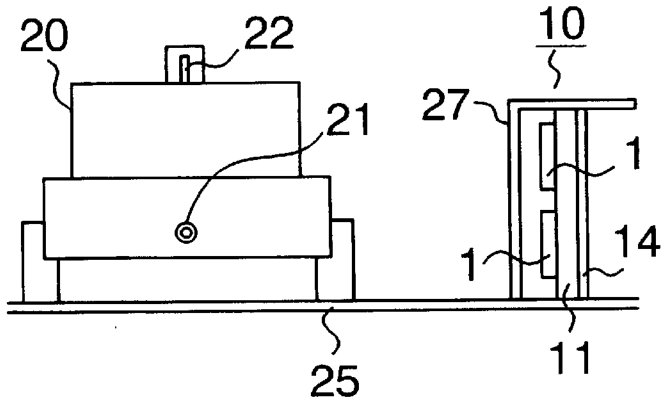
FIG. 11A and FIG. 11B are a sectional view and a side view, which indicate another arranging example of the plane multi-antenna in the information transmitting system according to the embodiment of the present invention.
Figure 11B:
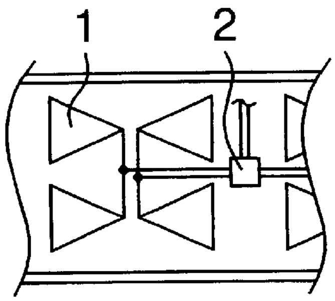
Figure 12A:
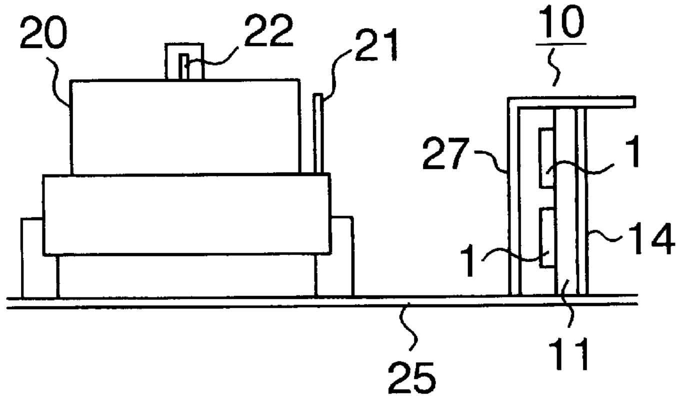
FIG. 12A and FIG. 12B are a sectional view and a side view, which indicate a further arranging example of the plane multi-antenna in the information transmitting system according to the embodiment of the present invention.
Figure 12B:
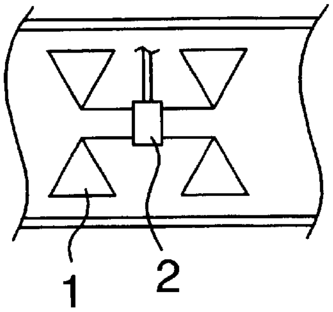

FIG. 10, FIG. 11A, FIG. 11B, FIG. 12A and FIG. 12B illustrate other structural examples of the plane multi-antenna. In these structural examples, with respect to the antenna 21 of the mobile station, the multi-antenna 10 employed in the fixed station is not arranged within the travel plate 25, but specially separated from this travel plate 25. FIG. 10 represents that the multi-antenna employed in the fixed station is arranged above the moving object, for instance, ceiling. FIGS. 11A, 11B, 12A and 12B, the multi-antenna of the fixed station is arranged on a side wall of the moving object in a travel space. Namely, this antenna is arranged along a direction perpendicular to the drawing plane. In these drawings, reference numeral 26 is a ceiling, and reference numeral 27 is a side wall. The mounting condition of the antenna 21 in the mobile station and the structure of the multi-antenna employed in the fixed station shown in FIGS. 11A and 11B are different from those of FIG. 12A and 12B. FIGS. 11A and 12A are sectional views for showing the moving object and the multi-antenna provided on the side of the fixed station.

It should be noted that each of the multi-antennas shown in FIG. 10, FIGS. 11A, 11B and FIGS. 12A, 12B may be structured by such a hierarchical structure of groups as illustrated in FIG. 5.

FIGS. 11A and 11B are side views for showing multi-antennas provided in the fixed station.

In the case of FIG. 11A, the antenna 21 of the mobile station 20 is positioned parallel to the multi-antenna as well as the travel surface. In the case of FIG. 11B, the antenna 21 is positioned parallel to the multi-antenna and perpendicular to the travel surface.

In the case of such a mobile station 20 having the antenna 21 shown in FIG. 11A, when the mobile station is travels on the rail (travel surface), there is no problem in the signal reception on the side of the fixed station. However, when the mobile station 20 happens to slip and the head portion of the mobile station would be directed to a direction perpendicular to the travel direction, the antenna is directed normal to the multi-antenna 10 of the fixed station, so that the signal receiving sensitivity by the multi-antenna would be considerably lowered. On the other hand, in the case of FIG. 12A, since the antenna 21 is still located parallel to the multi-antenna 10 provided in the fixed station even in such a case, the signal receiving sensitivity by the multi-antenna is not lowered, and therefore the signal can be transmitted/received under stable condition.

Figure 13A:
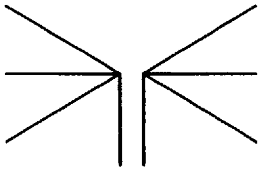
FIG. 13A to FIG. 13H illustrate arrangement of unit antennas used in the information transmitting system according to the present invention.
Figure 13B:
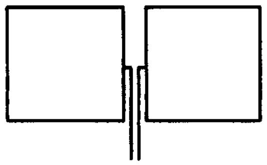
Figure 13C:
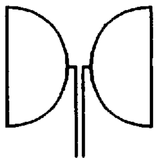
Figure 13D:
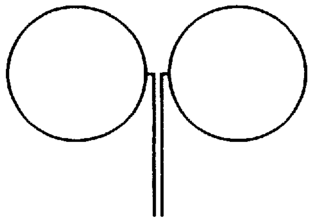

FIG. 13A to FIG. 13F represent a modified example of the plane unit antenna shown in FIG. 1 to FIG. 9. FIG. 13A shows a triangle-shaped unit antenna, FIG. 13B indicates a rectangular unit antenna, FIG. 13C denotes a semicircular unit antenna, and FIG. 13D indicates a circular (otherwise, elliptical unit antenna) unit antenna. These directivity characteristics are substantially equal to the directivity characteristic of the basic plane unit antenna 1 having the triangular shape, namely, the directivity of the well known three-dimensional spherical shape and elliptical shape (see FIG. 15A).

Figure 13E:
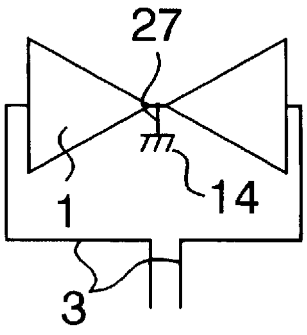
Figure 13F:
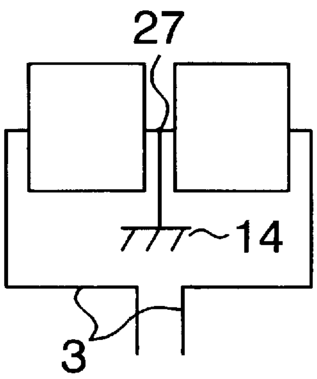
Figure 13G:
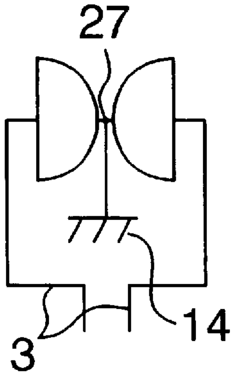
Figure 13H:
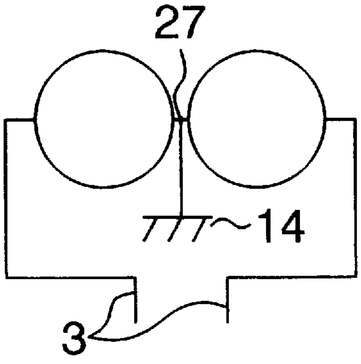

FIG. 13E shows a triangle-shaped unit antenna, FIG. 13F indicates a rectangular-shaped unit antenna, FIG. 13G denotes a semicircular-shaped (or, semi elliptical-shaped) unit antenna, and FIG. 13H represents a circular-shaped (or, elliptical-shaped) unit antenna. In these antenna structures, the feeders 3 are positioned outside these unit antennas, and the shortcircuit line 27 of the shield ground plate 14 is provided at a center position of the unit antenna. The directivity characteristic of these unit antennas becomes the well known doughnut-shaped characteristic.

It should be noted that any one of the above-described plane antennas shown in FIG. 13A to FIG. 13H may be arranged in such a way that a large number of plane antennas are installed as shown in FIGS. 1 to 9 and other embodiments (will be discussed later) to constitute a plane multi-antenna 10.

Figure 14:
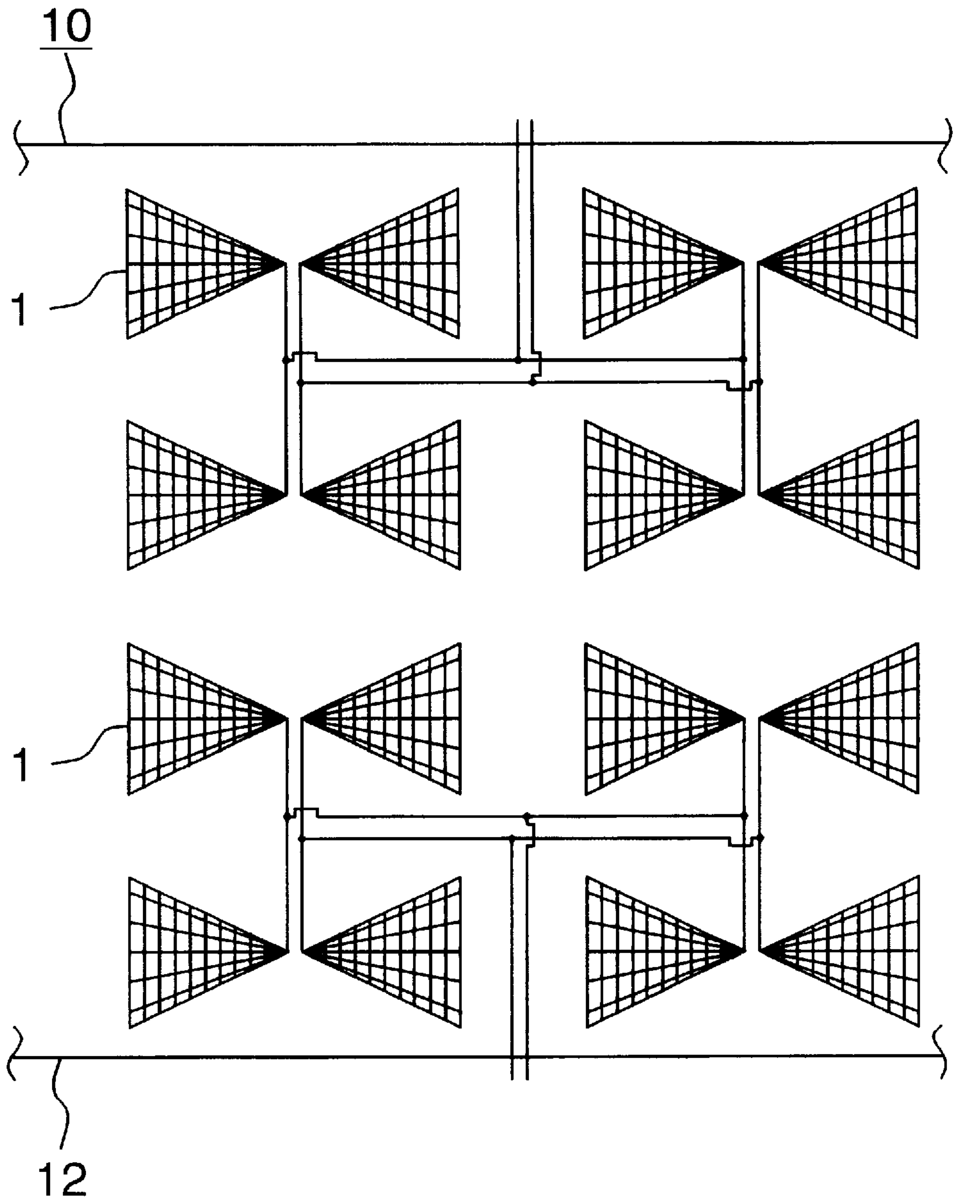
FIG. 14 is a plane view for showing a further example of the plane multi-antenna in the information transmitting system according to the embodiment of the present invention.

FIG. 14 illustratively indicates such an antenna structure in which, in order that the major portions of various plane multi-antennas 10 as previously stated and will be explain hereinafter are made of a flexible material, each of the plane unit antennas 1 is manufactured in a mesh form by using a conductive line material. Furthermore, not only the material of the travel plane, but also the material of the dielectric 1 positioned between the travel plate and the unit antenna as well as the material of the shield ground plate (not shown) are made of such a flexible material.

With the above-described structures, since the multi-antenna can be readily transported, stored, and installed, the multi-antennas can be easily assembled at the necessary places and be operated.

It should be understood that the shapes of the antenna 21 provided in the mobile station may be made of elements extended along two directions at a substantially right angle, other than a simple rod-shaped element so as to transmit/receive electromagnetic waves in the above-described and below-mentioned embodiments. For example, in a coil-shaped antenna, the respective coil surfaces are arranged substantially parallel to the plane multi-antenna 10. Since such a coil-shaped antenna is used, the antenna of the portable station owns the non-directivity. Even when the portable station 20 is traveled not along the travel surface, but is rotated along the right angle direction, or the reverse direction, counter positionings between the wave propagation planes among the antennas and the directivity (in particular, counter positionings among a direction of a dipole unit antenna, a direction of the antenna 21 in the portable station, and the wave propagation plane) are continuously carried out, so that a signal having a relatively better quality can be continuously transmitted/received.

Figure 15A:
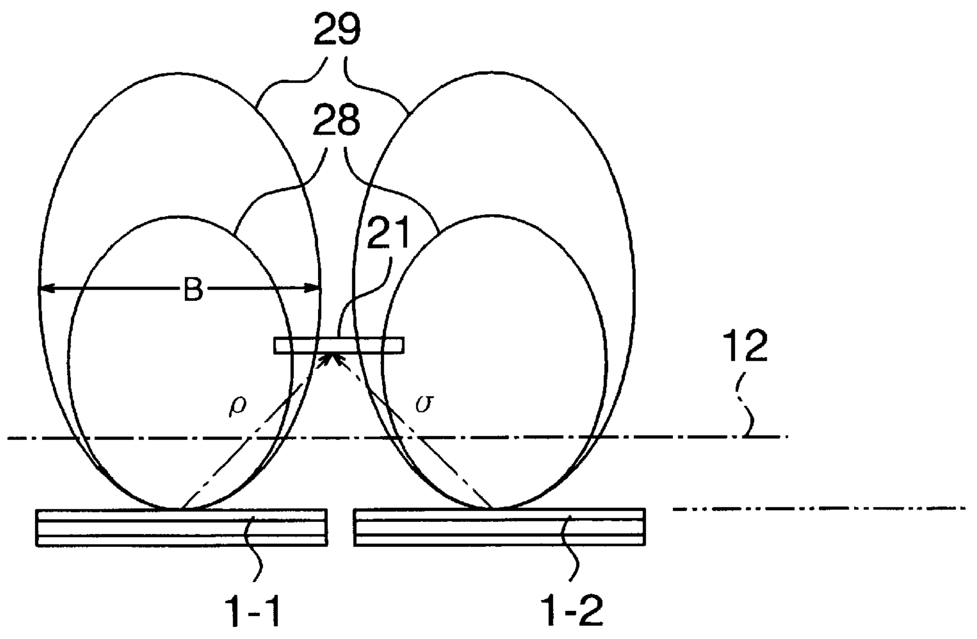
FIG. 15A and FIG. 15B are plan views for indicating a positional relationship and directivity between the antenna of the fixed station and the plane multi-antenna of the fixed station side in the information transmitting system according to the embodiment of the present invention.
Figure 15B:
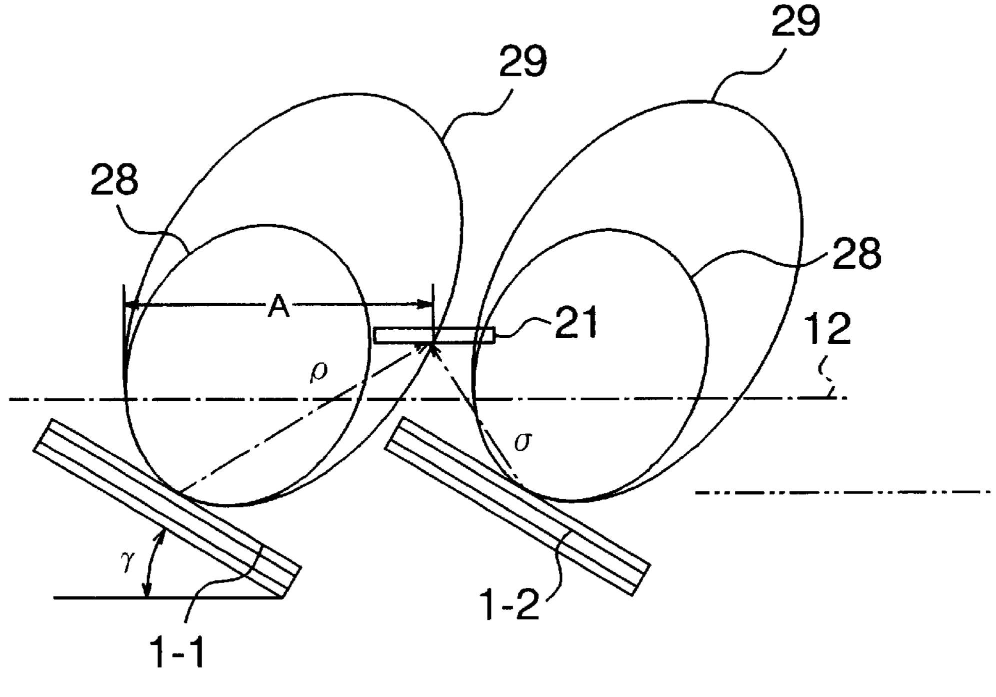

FIGS. 15A and 15B are operation explanatory diagrams in such a case that in a plane multi-antenna provided on the side of the fixed station, each of the plane unit antennas are installed either in parallel (FIG. 15A) to, or inclined (FIG. 15B) with respect to the antenna of the portable station. In the drawings, reference numerals 28 and 29 indicate directivity of field strengths.

In the antenna structure of FIG. 15A, there are some possibilities that the field strength "ρ" is substantially equal to the field strength "σ" at the antenna 21, depending upon the directivity of both unit antennas, near the boundaries among the antenna 21 of the portable station, and the plane unit antenna 1-1, 1-2.

At this time, if there is no phase difference in ρ and σ, then no problem occurs. However, if there is a phase difference, then a difference (ρ−σ) between the field strengths at the respective unit antennas 1-1 and 1-2 with respect to the plane unit antenna becomes extremely small. As a consequence, when there exists a phase shift between the signals received by the plane unit antennas 1-1 and 1-2, signal deterioration of the received picture information may occur.

On the other hand, when as shown in FIG. 15B, directivity of the plane unit antennas 1-1 and 1-2 is inclined (an inclined angle "γ" is selected to be smaller than, or equal to 45 degrees in this case) with respect to the radio signal transmitted from the antenna 21 of the portable station, there are many cases that a relationship of field strengths between ρ and σ becomes approximately ρ>σ near the boundary between these unit antennas 1-1 and 1-2. When there is a phase shift in the signals received between the plane unit antennas 1-1 and 1-2, a difference (ρ−σ) in the field strengths at the respective unit antennas 1-1 and 1-2 with respect to the antenna 21 of the mobile station becomes approximately "ρ". Thus, there is less deterioration in the signals of the received picture information, and the necessary signal level is maintained. Furthermore, the effective range of directivity of the unit antenna is widened, as compared with that of FIG. 15A. Namely, the effective range of FIG. 15A case with respect to the antenna 21 of the portable station becomes "B", whereas that of FIG. 15B case becomes "A". Therefore, mutual interference between these plane unit antenna can be suppressed.

Also, a difference between a field strength B and a field strength A becomes A−B>0. The field strength B is defined at the travel surface when directivity of the plane unit antennas 1-1 and 1-2 are perpendicular to each other. The field strength A is defined at the travel surface when directivity of the plane unit antennas 1-1 and 1-2 are inclined. In accordance with the method related to FIG. 15B, the effective components of the directivity is extended and the stronger field strength can be obtained on the travel surface.

Subsequently, a description will now be made of an information transmitting system capable of realizing a bidirectional communication with employment of a multi-antenna, according to an embodiment of the present invention.

First, two examples related to bidirectional communications effected between a mobile station and a fixed station will now be described.

When in the fixed station of FIG. 1 and FIG. 2, a transmitter is further employed in addition to a receiver apparatus, whereas an receiver is further employed in addition to a transmitter apparatus in the mobile station, a simple information transmitting system capable of performing a bidirectional communication can be arranged. An arrangement of FIG. 16 is an example realized y modifying the systems of FIG. 1 and FIG. 2 in the above-described manner.

In this case, in order that all of the mobile stations can transmit/receive the information at the same time, separate channels with different carrier frequencies must be allocated to a single mobile station for an up stream (namely, from mobile station to fixed station), and a down stream (namely, from fixed station to mobile station). Also, to perform a simultaneous transmission/reception, in an FM modulation system, at least such a frequency bandwidth must be set to proper values in accordance with the frequency modulation width in order to prevent mutual interference between the carrier frequency of the up stream channel and the carrier frequency of the down stream channel. For instance, 291 MHz is allocated to the carrier frequency of the up stream channel, and 288 to 294 MHz are allocated to the frequency bandwidth, whereas 303 MHz is allocated to the carrier frequency of the down stream, and 300 to 306 MHz are allocated to the frequency bandwidth in one pair of directional communications. With such a frequency allocation, a common antenna for signal transmission/reception purposes may be employed via a shared device by the respective mobile station and fixed station.

Figure 16:
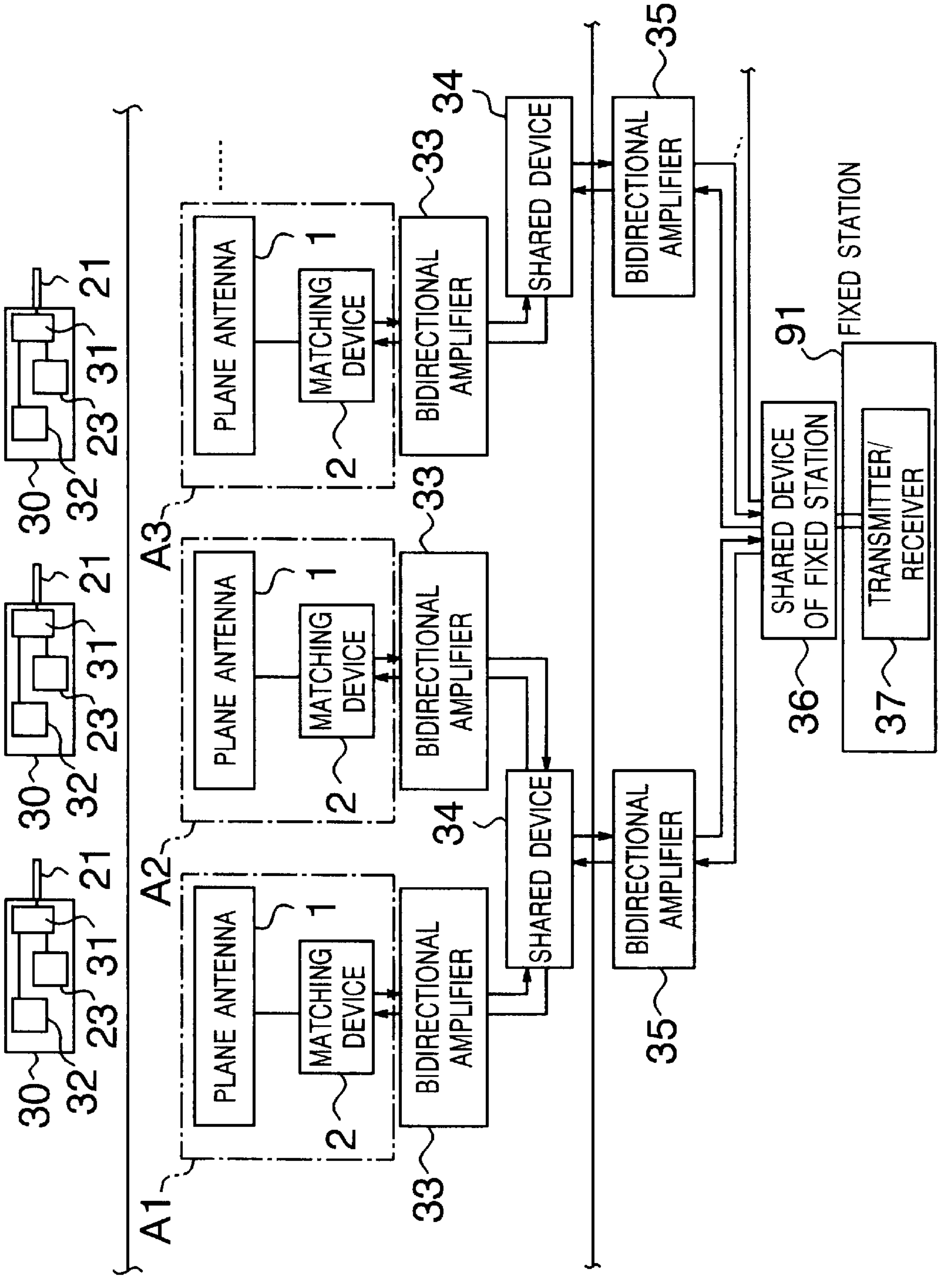
FIG. 16 is a schematic block diagram for indicating an overall arrangement of a bidirectional communication information transmitting system according to another embodiment of the present invention.
Figure 17:
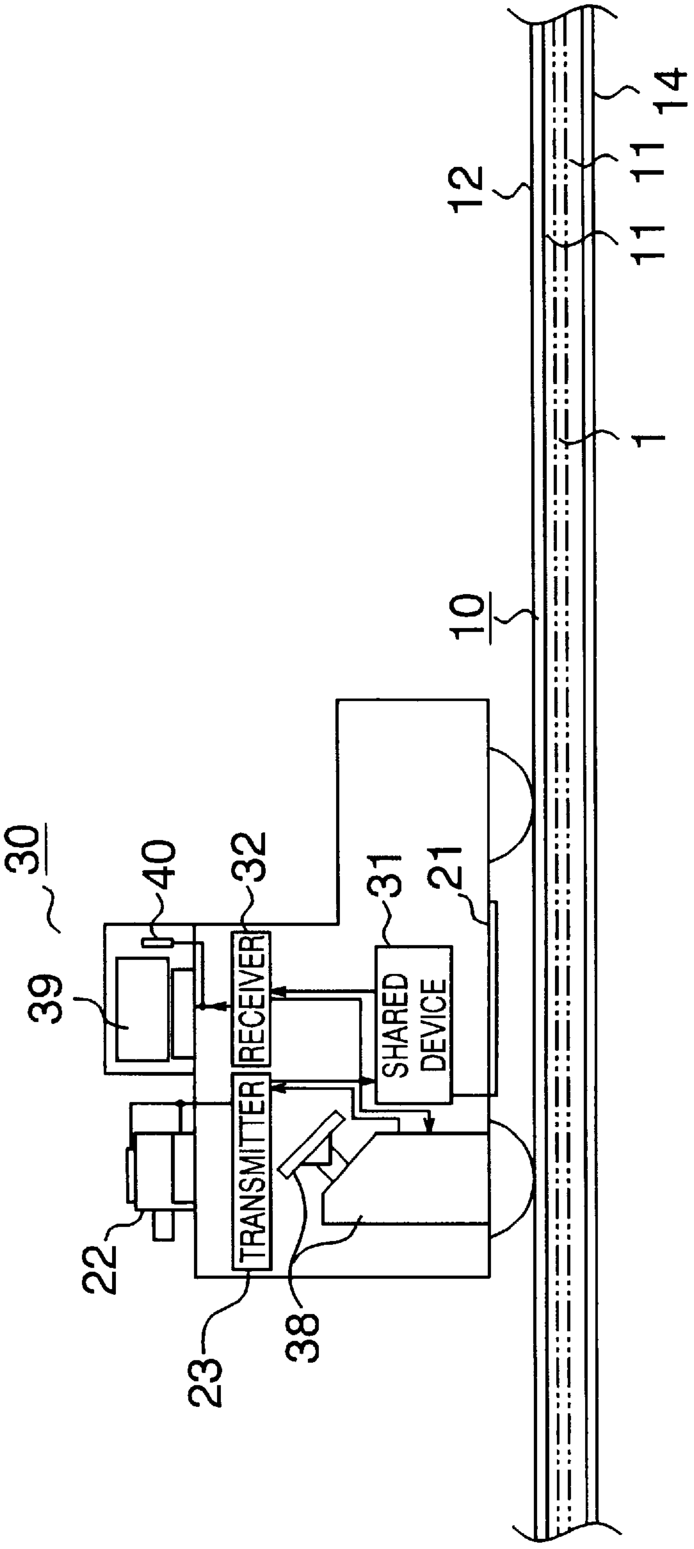
FIG. 17 shows an example of a structure of a mobile station in the system of FIG. 16.

In FIG. 16, there is shown an example of an arrangement of such an information transmitting system capable of transmitting picture information in a bidirectional manner. FIG. 17 is a schematic block diagram for showing an example of a structure of the mobile station in FIG. 16.

In correspondence with the system of FIG. 16, the mobile station of FIG. 17 performs a simultaneous transmission/reception by allocating one channel as an up stream and one channel as a down stream to a single mobile station with using a shared device 31 and a bidirectional communication transmitter.

Here, both of the mobile station and the fixed station are general stations such that filtering circuits having the up-stream/down-stream frequency bandwidths in the shared device are well known filtering devices, the receiver converts the received signal into the intermediate frequency signal, and thereafter demodulates the intermediate frequency signal to derive the control, video and audio signals, thereby producing picture display and audio output. Also, the transmitter is such a well known apparatus for modulating the control, video and audio signals to transmit the modulated signals.

A mobile station 30 is constructed of a shared device 31 for the mobile station, a mobile station transmitter 23 for amplifying and modifying such information signals as video information and video relation information, and a mobile station receiver 32 for amplifying/filtering/frequency-converting/demodulating such information signals as video information and video relation information. These mobile station transmitter 23 and receiver 32 are well known in the art.

Two different channels for transmission and reception purposes are allocated as signal channels for radio-transmitting information such as pictures to each of the plural mobile stations 30.

On the other hand, in the fixed station, the amplifier 6 of FIG. 1 is changed into a bidirectional amplifier 33. This fixed station is further comprised of a shared device 34, a bidirectional amplifier 35 having a bidirectional amplifying function, and a shared device 36 for the fixed station having a coupling and distributing function. The information is collected and distributed by the shared device 36 for the fixed station. Reference numeral 91 indicates a bidirectional communication fixed station. Reference numeral 37 shows a transmitter/receiver of the fixed station, which is well known in the art, and performs amplification/filtering/frequency convention/modulation/demodulation of information signals such as video information and video relation information.

The information (for instance, information to control the mobile station) from the fixed station 91 is supplied from the transmitter/receiver 37 via the shared device 36 for the fixed station and the bidirectional amplifier 35 to be amplified. Then, this information is amplified by the shared device 34 and the bidirectional amplifier 33 to become a necessary level, and the amplified information is distributed to the respective antenna large blocks A1, A2, - - - . Further, in each of the antenna large blocks, the amplified information signals are transmitted/distributed to the respective plane unit antennas 1, while establishing a matching through a coupler 5 and a coupler 2 (not shown). The channel signals specific to the respective mobile stations are received by the antenna 21 of the respective mobile stations. Furthermore, these specific channel signals are received via the shared device 31 for the mobile station by the receiver 32 for the mobile station. The received information is supplied to the operation apparatus 38 so as to be utilized as remote control information for controlling the travel direction and speed of the mobile station. Also, the received information is displayed on a monitor 39 and may be reproduced by a speaker 40.

As previously explained, the video information and the like derived from the mobile station are transmitted from the transmitter 23 of the respective mobile stations 30 via the shared device 31 for the mobile station by the antenna 21 in the up stream channel having the different frequency from that of the down stream channel. At this time, the speed/position information of the mobile station may be transmitted from the drive operation apparatus 38 via the transmitter 23.

Now, in the transmitter/receiver 37 provided ont he fixed station side, the information derived from a preselected mobile station is transferred to another preselected mobile station, so that the bidirectional communication can be established between the mobile stations. For example, a specific mobile station transmits information through the own up-stream channel CH1 to the fixed station, whereas this fixed station transmits this information to another specific mobile station different from the above mobile station by using the down stream channel CH4 of this specific mobile station operated as a counter party.

As described above, for example, when such specific channel allocations are made that one specific mobile station uses the up stream channel CH1 and the down stream channel CH2, whereas another specific mobile station uses the up stream channel CH3 and the down stream channel CH4, the simultaneous bidirectional transmission/reception can be simply realized between the specific mobile stations.

It is understandable from the above-described embodiment that with employment of the structures of the multi-antennas according to the present invention, the information can be transmitted/received between the mobile station and the fixed station over the travel range of the mobile station.

Then, referring to FIG. 17, an example of a robot (corresponding to the mobile station) capable of performing the bidirectional communication.

In the case when the mobile station 30 is a load carrying robot, the operation control apparatus 38 corresponds to a robot control apparatus for radio-controlling a moving direction, a speed, and a moving distance of this robot. Other reference numerals have been previously described.

This system is installed within a factory in which the plane multi-antenna 10 as shown in FIG. 1 is transported by a robot, the robot corresponding to the mobile station 30 is traveled on a travel surface, and information is radio-transmitted in an arbitrary frequency band between the robot and a control room provided on the fixed station side. Also, this system may be utilized as such a transmission system that video (picture) information and related information required for the mobile station 30 and the robot corresponding to another mobile station are transmitted/received in the radio signal mode between them. For instance, while observing the video information acquired by the television camera 22 of the mobile station 30 mounted on the robot, the operator at the fixed station 91 transmits the direction, speed, travel distance of this robot to the mobile station as the related information of the operation control apparatus 38, so that the remote control operation can be carried out.

Further, such an information transmitting system may be utilized as an information radio transmitting system such that the information is transmitted between an operation instructing room provided at the fixed station and a load lift-up portion of a crane car functioning as the mobile station. Also, this system may be used as an information radio transmitting system in which the information is radio-transmitted between a camera car for imaging a field corresponding to the mobile station and a broadcasting room provided in the fixed station. When the communication system with employing the multi-antenna according to the present invention is applied in a field or an acting room, such detailed information about moving viewers may be transmitted from a broadcasting room to the inside of the fixed station. Also, as train and automobile operation systems, detailed information about drive operations are radio-transmitted between the train or automobile as the mobile station, and an instruction room provided in the fixed station for the drive management. The systems shown in FIGS. 16 and 17 may be applied to the above-described multi-antennas and the below-mentioned multi-antennas.

Figure 18:
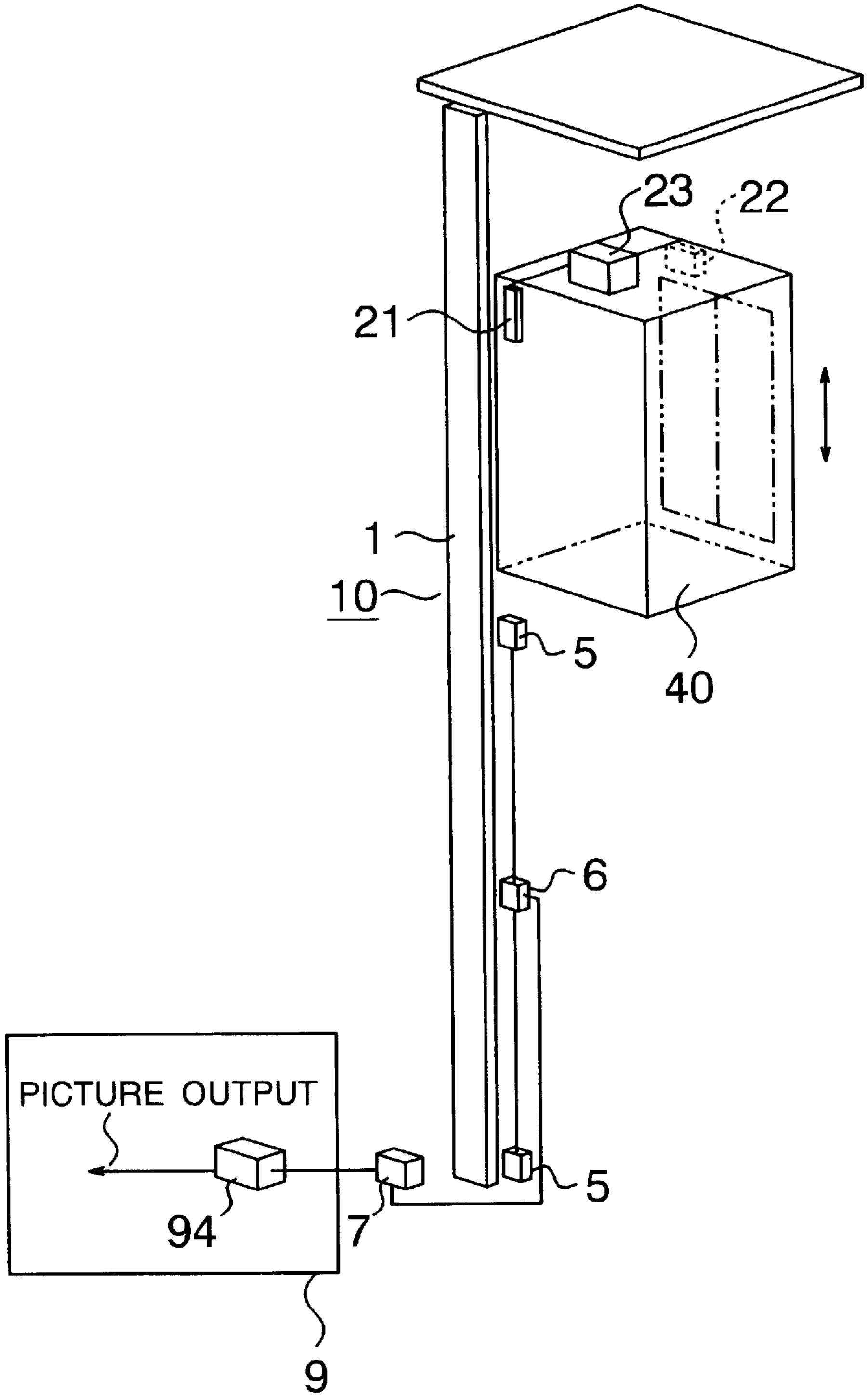
FIG. 18 schematically represents an overall arrangement of such an example that the information transmitting system according to the present invention is applied to an elevator.

In FIG. 18, there is represented such an embodiment that the present invention is applied to a picture radio transmission system for an elevator. In this drawing, reference numeral 40 shows a car of an elevator, and other reference numerals indicate the same elements as shown in FIG. 1. With such an arrangement as shown in FIG. 18, a picture within the elevator car 40 is picked up by a television camera 22, and then is transmitted via the transmitter 23 and the antenna 21 by the multi-antenna 10 so as to be monitored by the fixed station 9.

In the fixed station 9, the reception information signal from the coupler 7 is received by the receiver 94 and the picture (video) output is sent to a monitor and the like. It should be noted that the multi-antenna 10 is arranged along the rail of the elevator car 40 corresponding to the mobile station, and the structure of this multi-antenna may be constructed as any one of the above-described or the below-mentioned multi-antennas.

In accordance with this embodiment, it is also possible to arrange as follows. That is, the information may be sent from the fixed station 9 via the multi-antenna 10 to the elevator car 40, and then may be reproduced in this elevator car 40 to be displayed ont he monitor. In such a case, as the system arrangements of the fixed station and the elevator care, those of the previous embodiments shown in FIG. 16 and FIG. 17 may be employed.

The information transmitting system as illustrated in FIG. 18 may be applied to a rail road system in which the multi-antenna 10 may be provided along the rail.

As previously described, in the information transmitting system according to the above-explained respective embodiments, the qualities of images contained in such information as the picture (video) information with the wide bandwidth can be maintained. Then, the picture information with better qualities and the acquired relative information can be easily captured at any positions within the travel range over which the moving object can be traveled.

In addition to the above-described merit, the following advantages can be achieved in accordance with the respective embodiments:

1). Even when various standing waves of the transmitted signals caused by the multipath happen to occur during the transmission of picture information between the transmitter antenna and the receiver antenna, the distance between the transmitter antenna and the receiver antenna is set to a proper value, so that signal disturbances and deterioration in the S/N radio can be relatively reduced to be negligible low. These signal disturbances and S/N deterioration are caused by the fading phenomenon and the phase shifts due to the nearmost located shortest path and other paths. As a consequence, qualities of the information such as images can be maintained.

2). Since the multi-antennas of the fixed station are entirely provided along the travel surface of the mobile station, the antenna of the mobile station is continuously positioned opposite to the multi-antennas of the fixed station, so that the information with the wide bandwidth and having a level higher than a constant level can be simply and easily obtained.

3). Since the multi-antenna of the fixed station is located near the antenna of the mobile station, the transmission power from the moving object is low and can be effectively operated. The apparatus can be made simple and at low cost.

4). The multi-antenna of the fixed station is made in a plane shape, so that the plane multi-antenna can be operated to cover the travel range of the moving object. Therefore, no longer a large space is required to install such a multi-antenna, with is different from the conventional antenna installation.

5). Since the output power of the antenna can be selected to be very low, such a range over which the electromagnetic waves outputted from the antenna give adverse influences is limited. As a consequence, no adverse influences such as radio interference are given to other information transmitting systems.

6). As is known in the field, the bandwidths of the information transmitting frequency with respect to the carrier frequency are different from each other, depending on the modulation methods. When the frequency modulation (FM) system is employed, the wider the bandwidth of the FM signal becomes, the better the S/N ratio is improved. Accordingly, the information such as video information can be transmitted with better characteristics as to the surrounding noise. Furthermore, with respect to the S/N ratio, in the case that the travel surface is long, the plane multi-antenna is subdivided into several groups, so that the adverse influences by the noise and radio interference can be readily lowered.

7). Since very low electromagnetic waves are utilized, no interference is given to other communication means. Also, it is possible to arbitrarily set the frequency under use within such a range that no specific stronger waves are received from other communication means.

It should be understood that the above-described effects can be similarly achieved in the below-mentioned various embodiment of the present invention.

Next, with reference to FIG. 19 and FIG. 20, a description will be made of a plane multi-antenna provided on a fixed station side, according to another embodiment of the present invention. That is, in accordance with this plane multi-antenna, even when the travel direction of the mobile station is varied and thus this plane antenna is not continuously located in parallel to the multi-antenna of the fixed station, information can be transmitted/received with keeping better quality.

Figure 19:
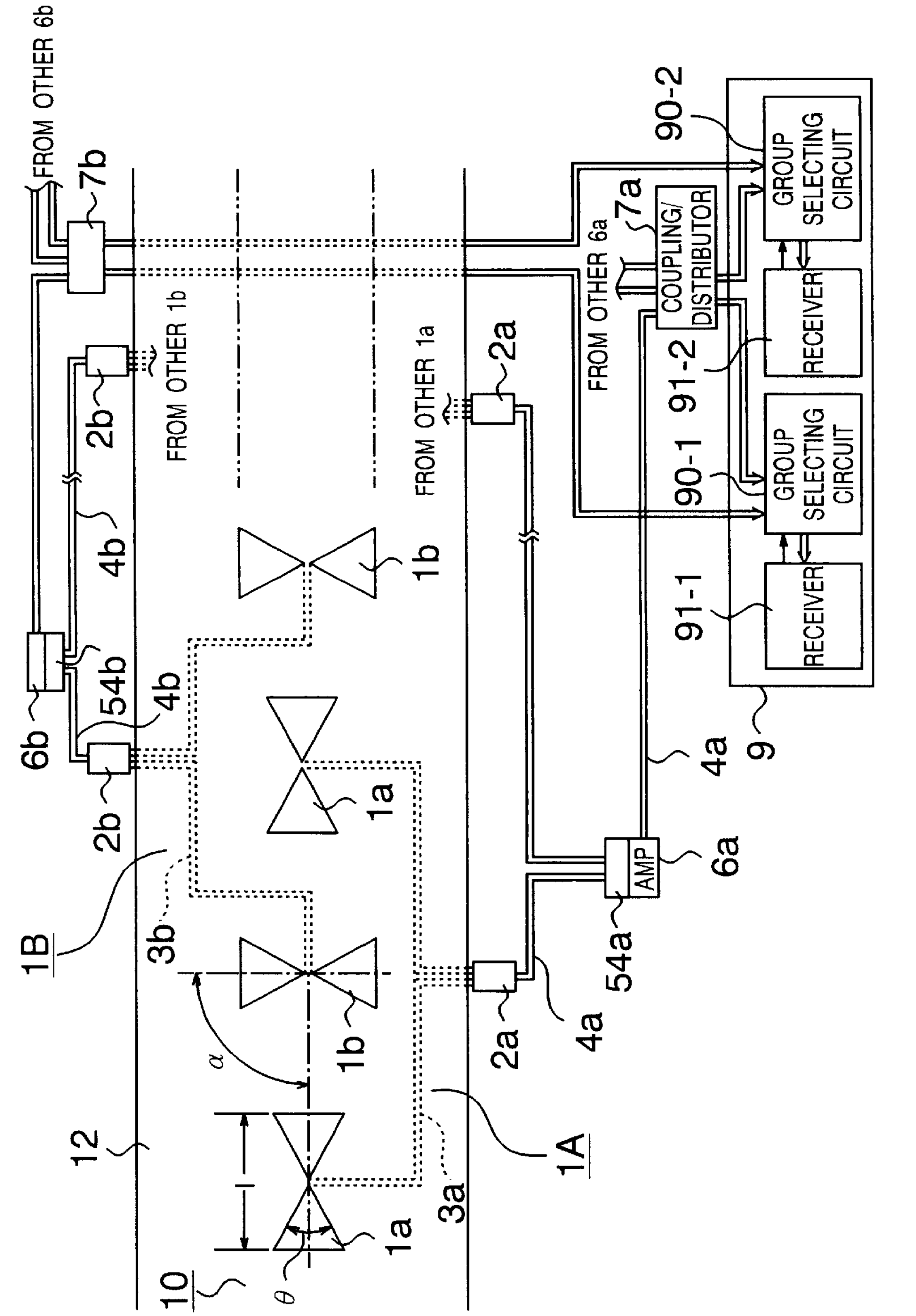
FIG. 19 is a plan view for representing a plane multi-antenna according to an embodiment of the present invention, and a fixed station employed in the information transmitting system according to a still further embodiment of the present invention.
Figure 20:
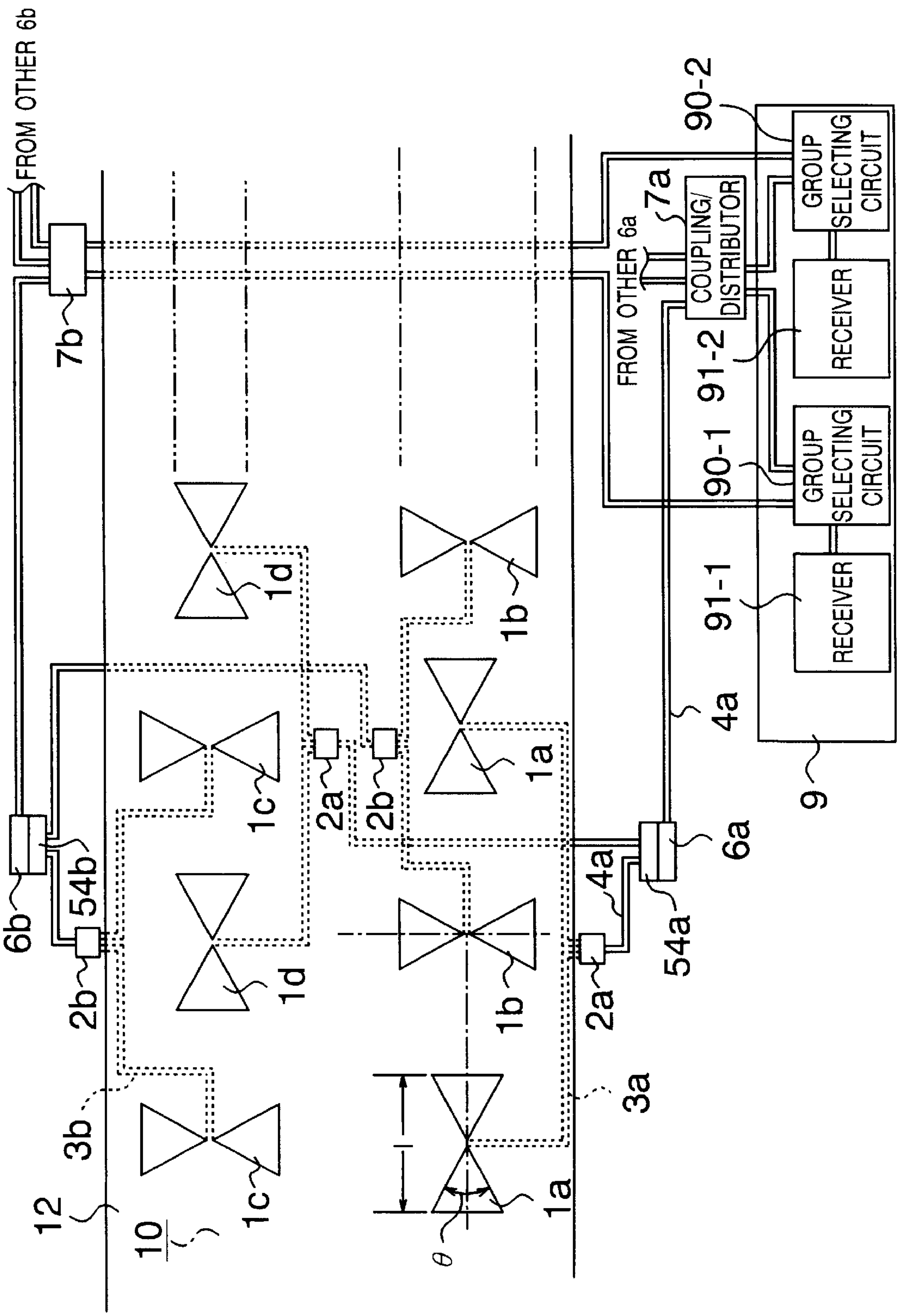
FIG. 20 is a plan view for showing a plane multi-antenna according to another embodiment of the present invention, and an information transmitting system with using this multi-antenna, according to a further embodiment of the present invention.

In FIG. 19 and FIG. 20 reference numerals 1*a* and 1*b* represent plane dipole unit antennas, respectively. Reference numerals 3*a* and 3*b* show feeders for the two plane unit antennas 1*a* and 1*b*. Reference numerals 2*a* and 2*b* indicate impedance matching couplers well known in the field. Reference numerals 4*a* and 4*b* are coaxial cables, reference numeral 54*a* indicates a coupler for coupling the respective plane unit antennas 1*a*, and reference numeral 54*b* indicates another coupler for coupling the respective plane unit antennas 1*b*. Furthermore, reference numerals 6*a* and 6*b* show amplifiers connected to the coupler 54*a* and the coupler 54*b*. As explained above, a large number of such plane unit antennas 1*a* and 1*b* are arranged to be coupled with each other, so that a plane multi-antenna 10 is constructed. This multi-antenna 10 is connected via the respective couplers 54*a*, 54*b*, the amplifiers 6*a*, 6*b*, and further the coupling distributors 7*a*, 7*b* to the fixed station 9.

Although not shown in the drawings, a large number of such multi-antennas are provided along a travel surface in this embodiment in a similar manner to that of the previous embodiment.

As an example of the plane unit antennas 1*a* and 1*b* according to this embodiment, the shape of this antenna is a well known triangle as a plane dipole antenna similar to the above-explained unit antenna 1. further, a dimension "l" of this plane dipole antenna is selected to be nearly equal to ($\lambda$/6) through ($\lambda$), and an angle "$\theta$" thereof is selected to be nearly equal to 30 through 90 degrees. Also, a distance between the adjoining unit antennas belonging to different groups is preferably shorter than, or equal to 2A.

At this time, the carrier wave of the transmission frequency is typically selected to be approximately 100 MHz to 10 GHz. The field strength (intensity) of the very low wave is selected to be lower than, or equal to 500 $\mu$V/m at a remote place by 3 m.

The feature of this embodiment is achieved that the shapes namely, directivity and so on of the electromagnetic waves irradiated from the multi-antenna constructed from at least two sorts of unit antennas 1*a* and 1*b* are directed to mutually different directions among the respective sorts of unit antennas. That is, the unit antennas are arranged n such a manner that a difference "α" in the setting angles of the unit antennas 1*a* and 1*b* for constituting two sorts of unit antenna groups is normally selected within a range of $45° \leqq \alpha \leqq 135°$. Preferably, this angel difference is selected within a range of $60° \leqq \alpha \leqq 120°$, and $\alpha = 90°$ is optimum.

In the embodiment shown in FIG. 19, there are provided two systems constructed of a group 1A of the plane unit antenna 1*a* and also another group 1B of the plane unit antenna 1*b*.

Alternatively, the above-described two groups 1A and 1B of unit antennas 1*a* and 1*b* are arranged in such way that more than two sets of antenna groups are positioned in parallel thereto along the longitudinal direction of the travel surface. Thus, the width of the travel surface may be made wider. As in the embodiment of FIG. 20, for instance, two groups of unit antennas 1*c* and 1*d* having the same structures as those of the above-described two groups of unit antennas 1*a* and 1*b* may be additionally provided.

In the embodiment of FIG. 20, a positional relationship between the unit antenna groups (1*c*) and the unit antenna group (1*d*) is identical to that between the unit antenna group (1*a*) and the unit antenna group (1*b*).

Figure 21:
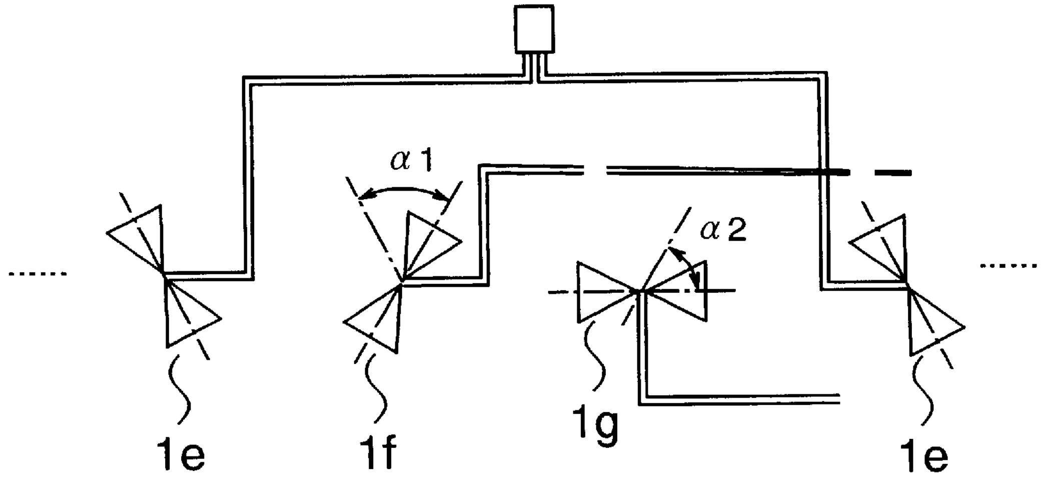
FIG. 21 is a plan view for showing a modified example of the plane multi-antenna shown in FIG. 19.

It should be noted that although two different sorts of unit antenna groups have been employed in the embodiments of FIG. 19 and FIG. 20, more than three different sorts of unit antenna groups may be used, for example, three sorts of unit antenna groups are utilized as shown in FIG. 21.

The multi-antenna shown in FIG. 21 is arranged by a group 1E of a unit antenna 1*e*, a group 1F of a unit antenna 1*f*, and a group 1G of a unit antenna 1*g*. A difference "α1" in setting angles between the unit antennas 1*e* and 1*f*, and also another difference "α2" in setting angles between the unit antennas 1*f* and 1*g* are given as $45° \leqq \alpha 1$ and $\alpha 2 \leqq 75°$. α1 and α2 are equal to 60 degrees as optimum values.

Although the unit antennas of the examples shown in FIG. 19, 20, 21 are arranged in such a manner that the antenna groups are alternately arranged every second group, the unit antennas of the different groups may be alternately arranged every plural groups.

Figure 22:
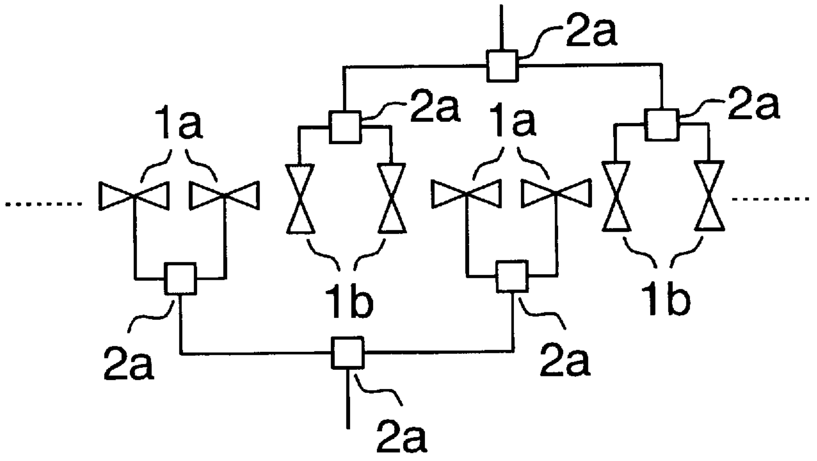
FIG. 22 is a plan view for showing another modification of the plane multi-antenna indicated in FIG. 19.

In other words, as illustrated in an example of FIG. 22, a plurality (e.g., two) of unit antennas 1*a* are continuously arranged, and a plurality (e.g., two) of unit antenna 1*b* are arranged adjacent to the first-mentioned unit antennas 1*a*.

As described above, according to this embodiment a plurality of unit antennas are alternately arranged adjacent to each other, these unit antennas are constructed of at least one unit antenna having the substantially same wave irradiation shapes with each other. The adjoining unit antennas are so arranged that directivity of them are different from each other. Here, the unit antennas are arranged by a single unit antenna in FIG. 19, and by two unit antennas in FIG. 22. Also, such a plurality of unit antenna units having the same wave irradiation shapes are combined with each other to constitute a single unit antenna group.

As a result, irrelevant to the positions (namely, antenna directions) of the mobile station, both of the mobile station antenna and a single unit antenna group of the multi-antenna are continuously located opposite to the horizontal and vertical polarized wave-fronts of the electromagnetic waves.

Figure 23:
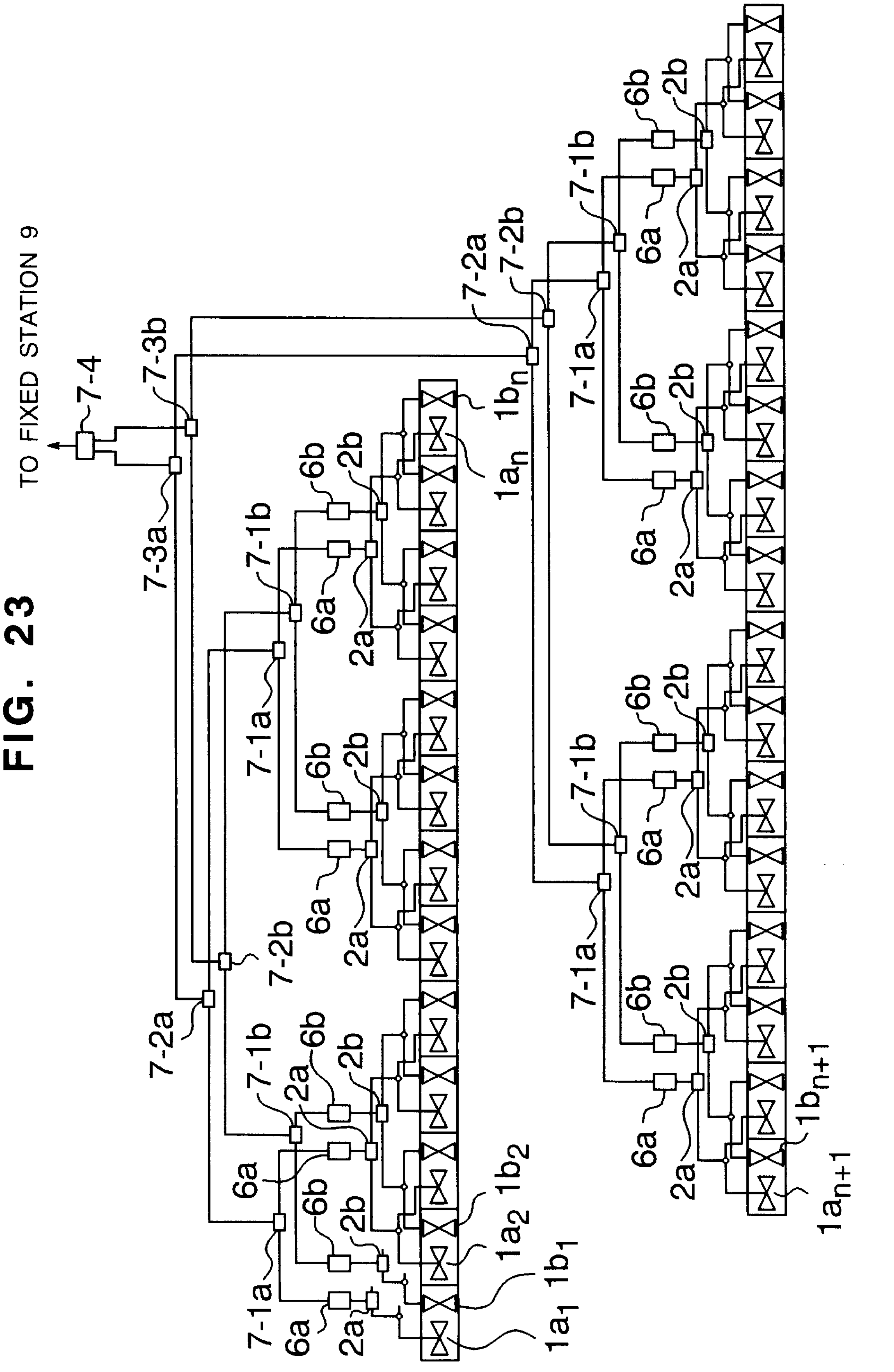
FIG. 23 is a plan view for indicating a further embodiment of the plane multi-antenna of the present invention.

It should be noted that the plane multi-antenna having the structure of FIG. 19 may be arranged as the hierarchical structure as shown in the example of FIG. 5, as one example indicated in FIG. 23. It should be noted that a unit antenna 1*bn* and another unit antenna 1*an*+1 are continued along the travel surface.

Figure 24:
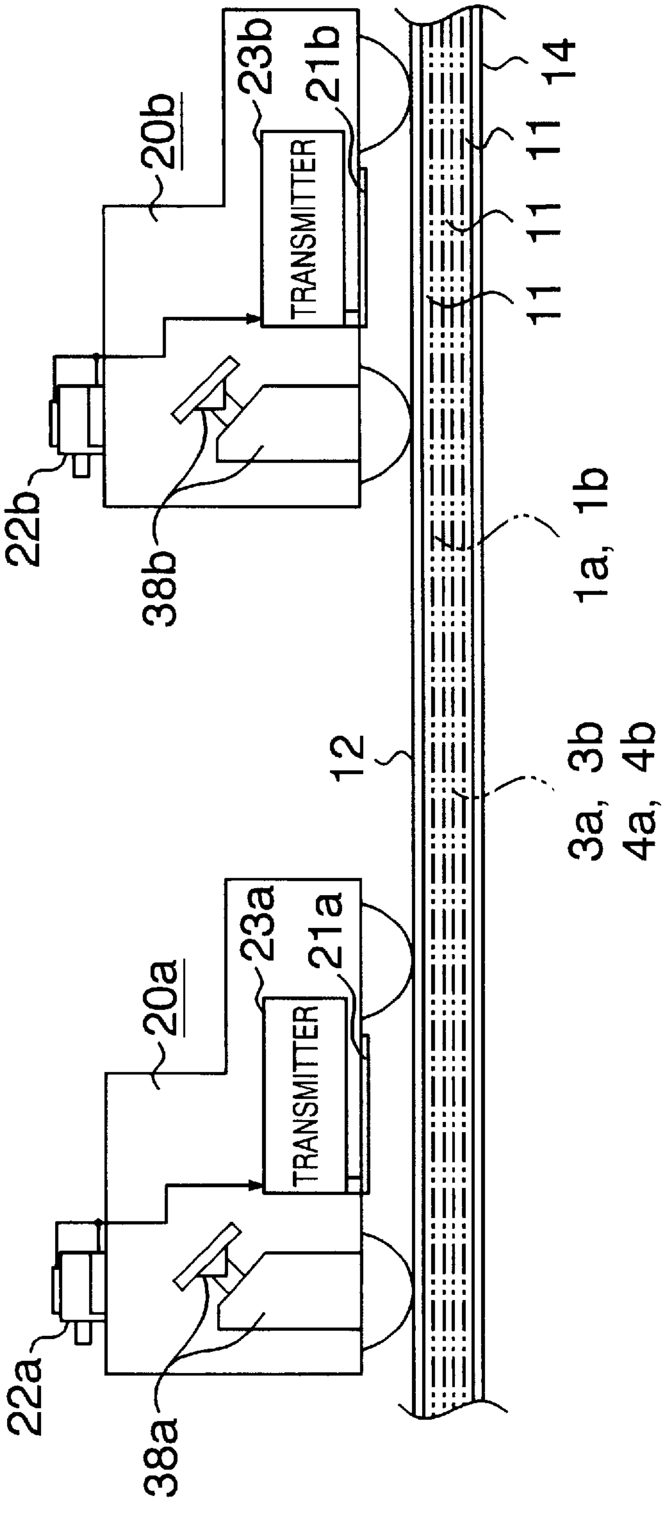
FIG. 24 is a side view for indicating a mobile station and a plane multi-antenna provided on a fixed station side employed in an information transmitting system according to a still further embodiment of the present invention, which uses any one of the plane multi-antennas indicated in FIGS. 19, 20, 22 and 23.

FIG. 24 is a side view for representing an example of an arranging relationship between the respective moving objects corresponding to the mobile station, antennas thereof, and the multi-antenna 10 of the fixed station shown in any one of FIGS. 19, 20, 22, 23.

The structures of the mobile stations 20*a* and 20*b* are identical to those of FIG. 2 and FIG. 4, and descriptions thereof are omitted. It should be noted that reference numbers 38*a* and 38*b* represent operation (drive) control apparatuses.

Referring now to FIG. 19, FIG. 20, FIG. 24 and FIG. 25, operations of the information transmitting system shown in FIG. 24 will be explained.

In FIG. 19 and FIG. 20, a picture (video) information radio transmission signal in a channel CH1 derived from a mobile station 20*a*, and a picture information radio transmission signal in a channel CH2 derived from a mobile station 20*b* are transmitted through the plane multi-antenna 10 and amplified by amplifiers 6*a* and 6*b* so as to obtain necessary signal levels. The amplified transmission signals are processed by distributor/couplers 7*a* and 7*b* having the mixing function to acquire the picture information. Then, the processed picture information transmission signals in the channels CH1 and CH2 are supplied to the fixed station 9. The respective receivers 91-1, 91-2, - - - , employed in the fixed station 9 selectively receive the transmission signal in the channel CH1 or CH2, if required. It is of course possible to construct that the receivers 91-1 and 91-2 exclusively select the corresponding channel signals CH1, CH2 by omitting the channel selecting functions.

Figure 25:
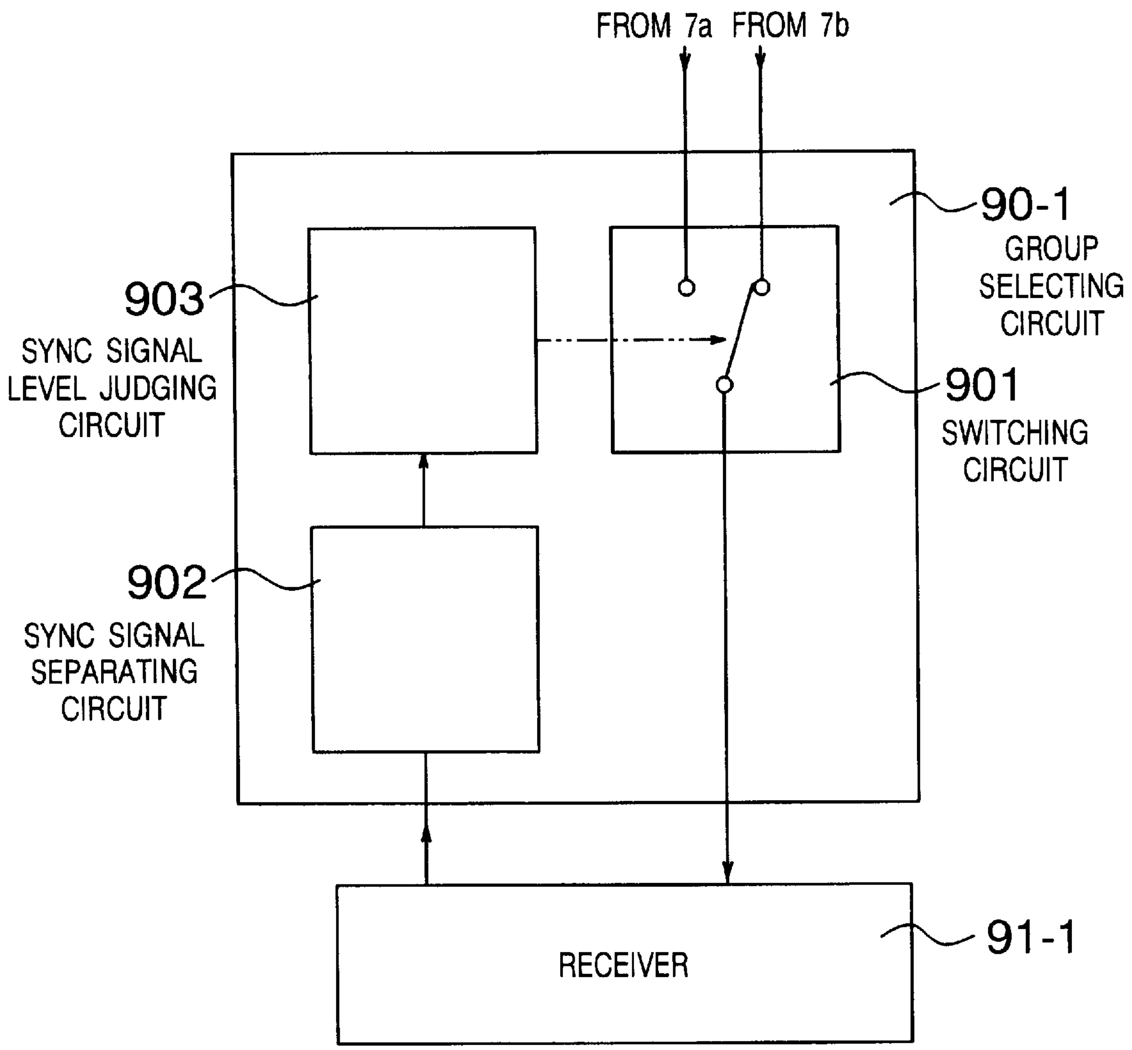
FIG. 25 is a schematic block diagram for indicating a structural example of a group selecting circuit 90 shown in FIG. 19 and FIG. 20.

FIG. 25 is a schematic block diagram for showing an antenna group selecting circuit (simply will be referred to a "group selecting circuit" hereinafter) 90 (90-1, 90-2) provided in each of the channels CH1 and CH2. In this drawing, a group selecting circuit 90-1 exclusively used to the channel CH1 is illustrated. It should be understood that the structure of the group selecting circuit 90-2 exclusively used to the channel CH2 is identical to that of the above-explained group selecting circuit 90-1.

In FIG. 25, the picture signals of the channels CH1 and CH2 corresponding to the antenna outputs derived from two groups 1A and 1B of the unit antennas 1*a* and 1*b* are entered from the respective coupling distributors 7*a*, 7*b* to a switching circuit 901 of the group selecting circuit 90-1, so that one of the picture signals in the channels CH1 and Ch2 derived from the selected unit antenna group 1A or 1B by the switching circuit 901 is selected to be supplied to the receiver 91-1. The picture signal given to the receiver 91-1 is inputted to the group selecting circuit 90-1, and then is supplied to signal component extracting circuit, for instance, a sync signal separating circuit 902 so as to separate and extract a certain featured component of the picture signal, namely the sync signal in this example. The extracted sync signal is inputted to a sync signal level judging circuit 903. The sync signal level judging circuit 903 detects a change in the sync signal levels, and supplies the detection result to the switching circuit 901.

With the above-described circuit arrangement, the picture signal having the high reception level among the picture signals received by the different antenna groups 1A and 1B is continuously, selectively supplied to the receiver 91-1. More specifically, the picture signal outputted from the receiver 91-1 is again inputted to the group selecting circuit 90-1, and then is furnished to the sync signal separating circuit 902. As is generally known, since a sync signal owns a polarity opposite to that of a picture signal, these signals can be easily separated from each other. The separated sync signal is directly proportional to the transmission quality, i.e., constant irrelevant to the output of the picture signal. The output of this sync signal is inputted to the sync signal level judging circuit 903. When the level of this sync signal is lowered below a constant level, this level change is detected and the detection result is outputted as a switching instruction. In response to this switching instruction, the switching circuit 901 switches the connections in order to enter the picture signal derived from another unit antenna group.

As described above, the antenna outputs from the two series of unit antenna groups 1A and 1B are inputted to the group selecting circuit 90 in the fixed station 9, and the picture signal derived from one of these unit antenna groups selected by this group selecting circuit 90 is transmitted to the receiver 91 so as to be demodulated, thereby obtaining the baseband picture information.

Under such a condition, when the respective mobile stations 20*a* and 20*b* are traveled in a linear form on the travel surface 12 along the longitudinal direction of this travel surface, since the wave couplings of the propagated waves in the unit antenna group 1A of the plane multi-antenna 10 during the signal transmission and reception are present along the same direction and also the better wave coupling of the propagated waves can be achieved, the antenna output signals from the antenna group 1A are selected by the group selecting circuits 90-1 and 90-2 of the fixed station 9 to be inputted to the receivers 91-1 and 91-2.

When the respective mobile stations 20*a* and 20*b* are traveled along a direction perpendicular to the longitudinal direction of the travel surface on this travel surface, since the wave couplings of the propagated waves in the unit antenna group 1B of the plane multi-antenna 10 during the signal transmission and reception are present along the same direction and also the better wave coupling of the propagated waves can be achieved, the antenna output signals from the antenna group 1B are selected by the group selecting circuits 90-1 and 90-2 of the fixed station 9 to be inputted to the receivers 91-1 and 91-2.

When the mobile station 20*a* is traveled on the travel surface 12 along a direction perpendicular to the longitudinal direction of this travel surface, since the antenna groups 1A and 1B are selected to each of these mobile stations 20*a* and 20*b*, the respective receivers can select and receive the output signal with the better wave couplings and the better quality.

With the above-described structure, the information such as the wide band picture information can be simultaneously obtained in several channels under small power, very small power by the simple and low-cost radio transmitting system with high quality. It should be noted that the mobile station is not always traveled in a linear form along the travel surface along the longitudinal direction, but may be traveled along the direction perpendicular to the longitudinal direction so as to escape from interference. Furthermore, the mobile station may be rotated in the reverse direction to be traveled. In any cases, the antennas of the mobile station and fixed station can continuously transmit the signal with better quality to the selected antenna group whose wave propagation plane and directivity are located opposite to those of the first-mentioned antennas. Such a structure may be applied to embodiments shown in FIG. 21 to FIG. 23. When this structure is applied to FIG. 21, the group selecting circuits 90-1 and 90-2 select any one of the three groups 1E, 1F and 1G.

The above-explained embodiment of FIGS. 19 to 25 correspond to such embodiments related to the information transmitting system for transmitting the information from the mobile station to the fixed station. Next, an embodiment about a bidirectional communication system will be described.

Figure 26:
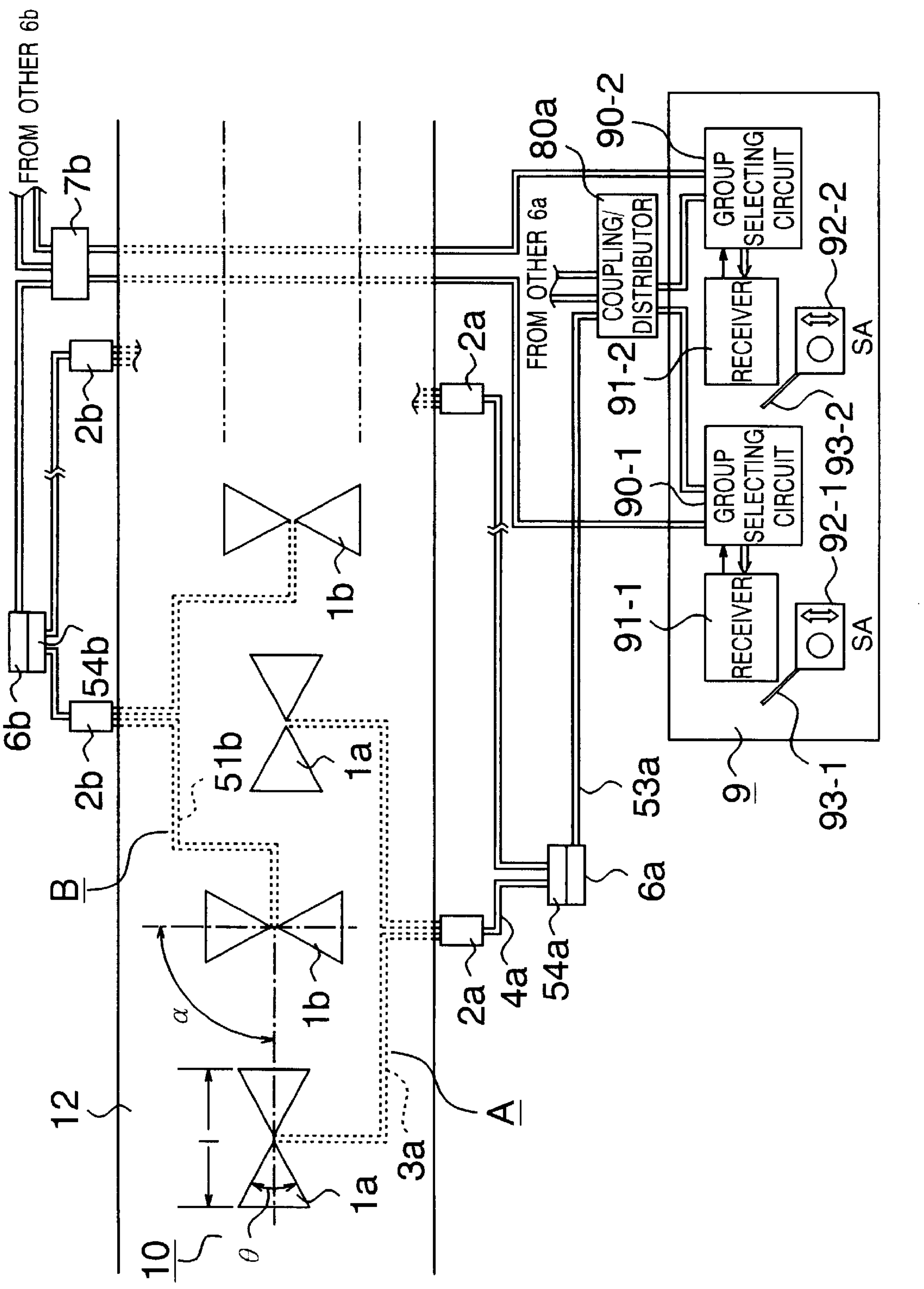
FIG. 26 is a schematic block diagram for representing an overall arrangement of such an information transmitting system that the information transmitting system of FIG. 20 is operable in the bidirectional communication mode.
Figure 27:
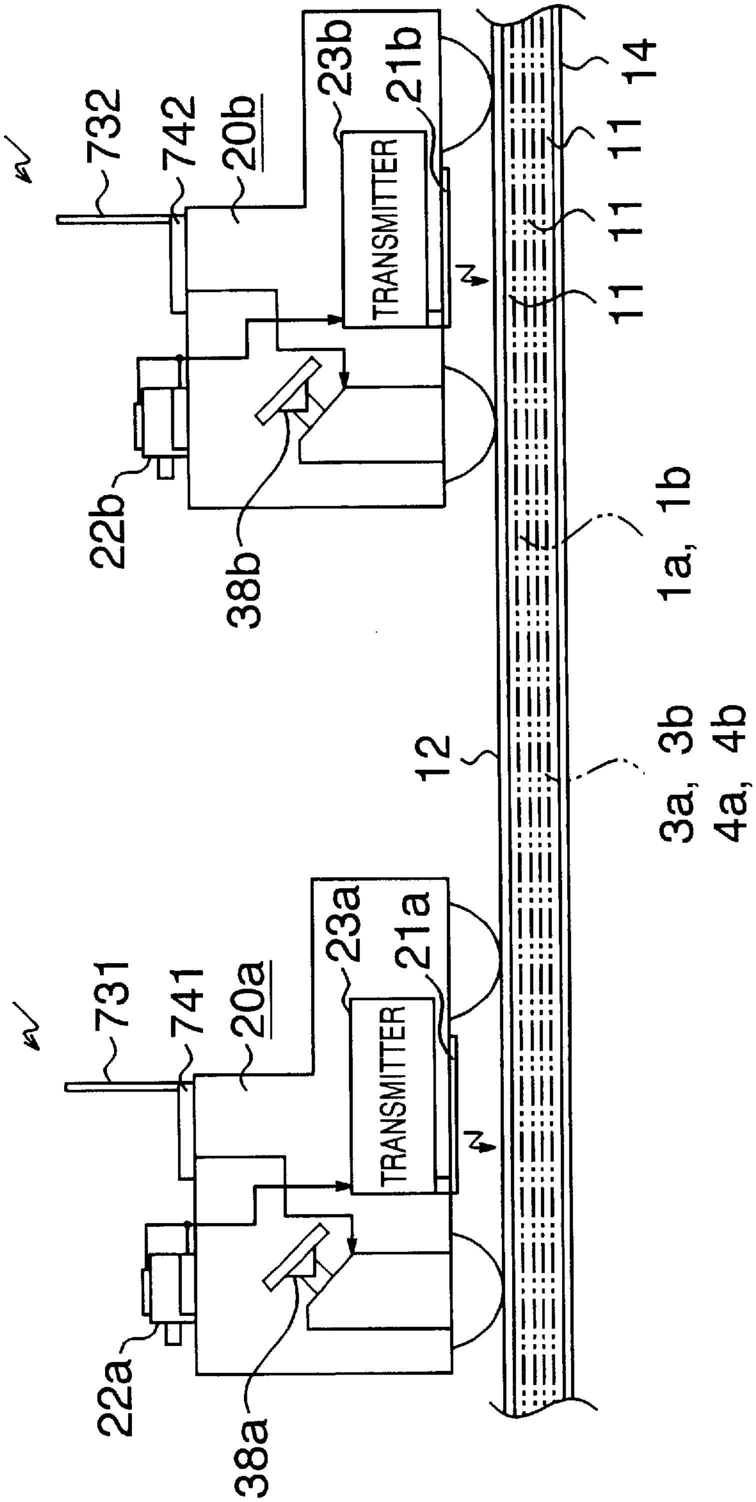
FIG. 27 is a side view for showing a structural example of a mobile station and the plane multi-antenna on the fixed station side in FIG. 26.

FIG. 26 represents an example of an information transmitting system in which information about, for instance, a drive control signal of a mobile station is transmitted from a fixed station to the mobile station in addition to the information transmission system of the picture information from the mobile station shown in FIG. 19 to the fixed station. FIG. 27 shows an arrangement of the mobile station in this case.

In FIG. 26, radio transmitters 92-1 and 92-2 are provided with the fixed station 9, and the radio transmitters own such a function to modulate a control signal for controlling the travel directions and the travel speeds of the respective mobile stations 20*a* and 20*b* and to transmit the modulated control signal to the mobile station while observing picture output displays at the receivers 91-1 and 91-2 of the fixed station 9. Reference numerals 93-1 and 93-2 indicate antennas of the transmitters 92-1 and 92-2. The information transmitted from the mobile station to the fixed station is the picture signal which requires the wide bandwidth, whereas since the radio transmitters transmit the simple information in this case, such a simple radio communication condition is satisfactorily required, namely the bandwidth is lower than, or equal to 100 KHz; the frequency is between 10 MHz and 100 MHz in the FM mode.

The mobile stations 20*a* and 20*b* shown in FIG. 27 are arranged by television cameras 22*a*, 22*b*; transmitters 23*a*, 23*b*; antennas 21*a*, 21*b* for transmitting information such as video information; antennas 731, 732 for receiving control signals; control signal receivers 741, 742 for converting the received control signal into an intermediate frequency signal; and furthermore operation control apparatus 38*a*, 38*b* for controlling travel directions and travel speeds of the mobile station.

For instance, the mobile station 20*a* of the channel CH1 will now be explained with reference to the above-described arrangement. First, on the side of the fixed station 9, while observing the picture display received from the mobile station 20*a* by way of the receiver 91-1 of the fixed station 9 for the channel CH1, the operator operates the radio transmitter 92-1 to modulate the control signal for controlling the travel direction and the travel speed of the mobile station 20*a* with the carrier frequency different from the frequency of the picture reception signal, and radio-transmits the FM control signal via the antenna 93. The FM control signal is received by the control signal receiving antenna 731 of the mobile station 20*a*, and then the received control signal is converted into the intermediate frequency signal and demodulated by the control signal receiver 741. In response to this demodulated control signal, the operation control apparatus 38*a* is operated, so that the travel direction and the travel speed of the control station 20*a* are controlled. Such an operation is similarly performed also in the mobile station 20*b* of the channel CH2.

As described above, since at least two antenna groups having different directivity from each other, which are constructed of a large number of plane unit antennas, are employed in this system, the information can be transmitted from the mobile station to the fixed station under stable condition. Furthermore, the data information related to the picture information such as the control signal from the fixed station to the mobile station can be transmitted/received. It should be noted that the mobile station is not always traveled in a linear form along the travel surface along the longitudinal direction, but may be traveled along the direction perpendicular to the longitudinal direction so as to escape from interference. Furthermore, the mobile station may be rotated in the reverse direction to be traveled. In this embodiment, the fixed station can continuously receive the signal with better quality by selecting the antenna group whose wave propagation plane and directivity are located opposite to those of the first-mentioned antennas. Based on the data information such as the control signal, the travel direction and the travel speed of the mobile station can be controlled. As a consequence, as the actual example of the moving object shown in FIG. 27, a load carrying car and a radio-controlled robot are optimum. It should be noted in FIGS. 26 and 27, the system is arranged in a similar manner to that of FIG. 16 and FIG. 17, so that the antennas 21*a*, 21*b*, and the antenna groups 1A and 1B may be commonly operated for transmission/reception purposes.

The bandwidths of the picture information transmission frequency are different from each other with respect to the carrier wave, depending upon the modulation system. When the FM system is employed, the wider the bandwidth becomes, the better the S/N ratio is achieved. By this FM system, more effective picture information transmission is available as to the surrounding noise. For instance, the transmission bandwidth is selected to be higher than, or equal to approximately 6 MHz.

It should be noted that each of the mobile stations may modulate such information related to a video (picture) of a television camera, for instance, sound information, or positional information of a GPS (global positioning system by satellite) and thereafter may transmit the modulated signal (generally speaking, modulating operation of a modulator employed in a transmitter is normal).

As previously explained, the dipole antenna has been described as to the unit antenna of the fixed station. The present invention is not limited to this dipole antenna, but may be applied to other types of antenna. Also, the rod-shaped antenna has been explained as the antenna of the mobile station, but the present invention is not limited thereto.

In accordance with the embodiment shown in FIGS. 19 to 27, there are the following effects other than the effects achieved in the embodiments, of FIGS. 1 to 18. That is, the picture information with the wide bandwidth can be easily, simply obtained as the picture information with better qualities and the acquired relative information at any positions, while the antenna of the mobile station is continuously located opposite to the antenna of the fixed station. In particular, even when the mobile station is traveled in any travel directions, signal disturbances and deterioration in the S/N radio can be relatively reduced to be negligible low. These signal disturbances and S/N deterioration are caused by the fading phenomenon and the phase shifts, while maintaining the better image quality level. As the better picture information and the related information, even where the mobile station is present, the antennas of the mobile station and the fixed station are positioned opposite to each other, so that constant information can be simply, easily obtained.

Figure 28:
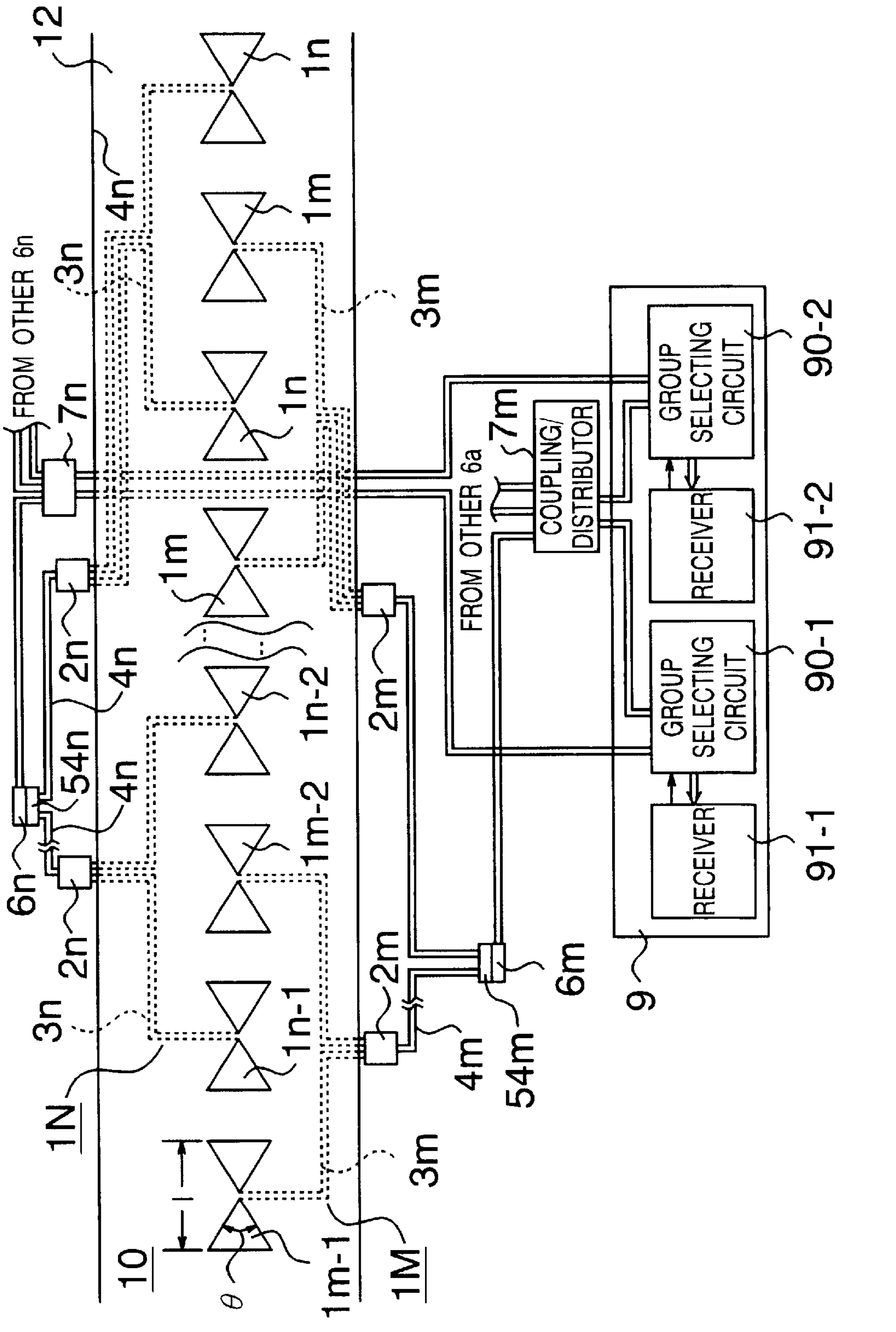
FIG. 28 is a plan view for indicating an example of the plane multi-antenna provided on the fixed station side employed in the information transmitting system according to a further embodiment of the present invention.
Figure 29:
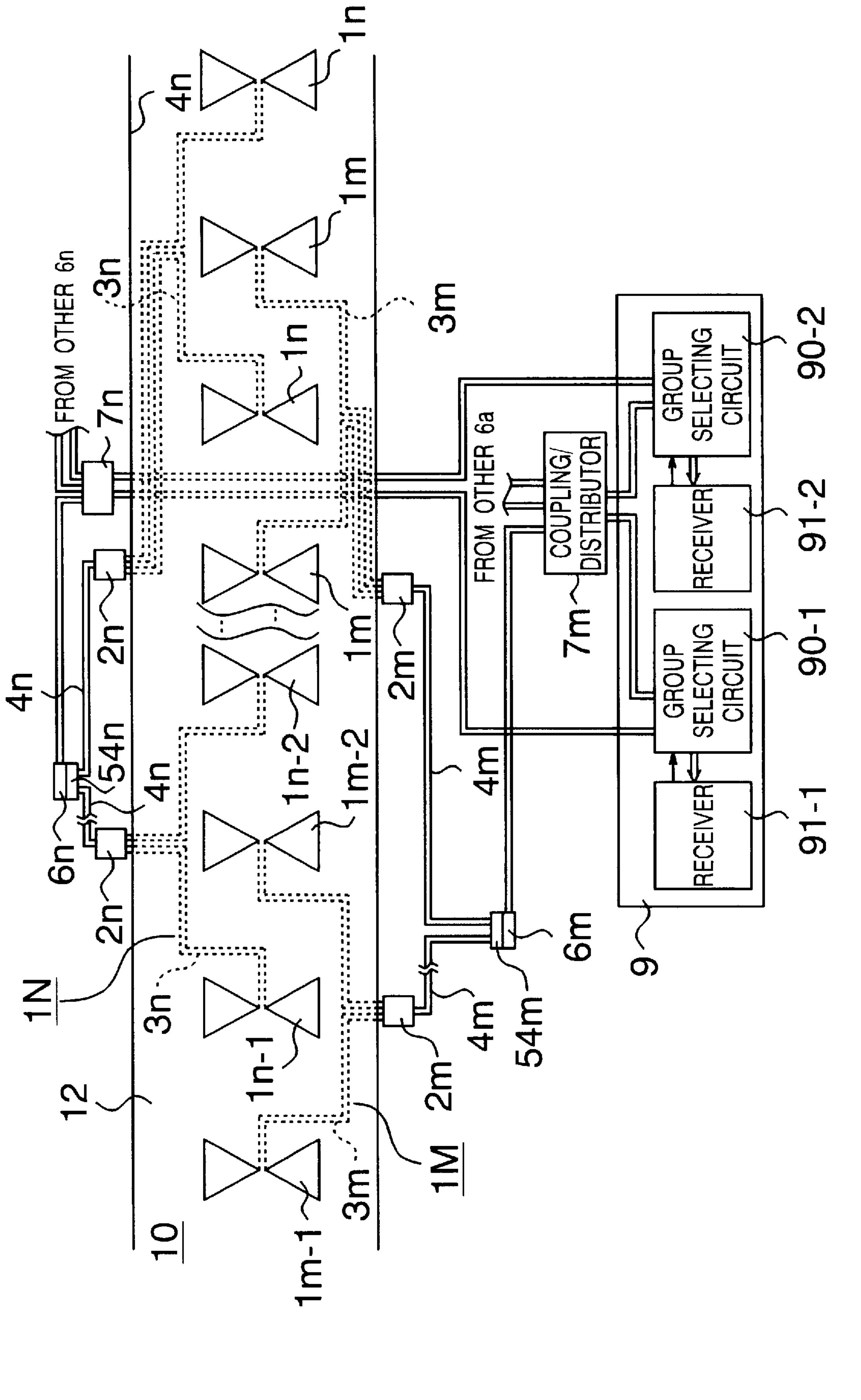
FIG. 29 is a plan view for showing another example of the plane multi-antenna provided on the fixed station side employed in the information transmitting system according to a further embodiment of the present invention.

Next, such a multi-antenna used in the information transmitting system according to the present invention will be explained. That is, a plurality of unit antenna units are alternately arranged adjacent to each other, which are constructed of at least single unit antenna existing in an electromagnetic wave propagation range that in-phase components of the received electromagnetic waves become major components, and the in-phase components of the received electromagnetic waves in the mutually adjacent unit antenna units are different from each other. FIGS. 28 and 29 show information transmitting systems equipped with another example of such a multi-antenna.

In FIG. 28 and FIG. 29, reference numerals 1*m* and 1*n* represent plane dipole unit antennas, respectively. Reference numerals 3*m* and 3*n* show feeders for the two plane unit antennas 1*m* and 1*n*. Reference numerals 2*m* and 2*n* indicate impedance matching couplers well known in the field. Reference numerals 4*m* and 4*n* are coaxial cables, reference numeral 54*m* indicates a coupler for coupling the respective plane unit antennas 1*m*, and reference numeral 54*n* indicates another coupler for coupling the respective plane unit antennas 1*n*. Furthermore, reference numerals 6*m* and 6*n* show amplifiers connected to the coupler 54*m* and the coupler 54*n*.

In the embodiment of FIG. 28 and FIG. 29, the unit antenna unit is arranged by a single unit antenna, but may be arranged by more than two unit antennas. A plurality of unit antenna unit whose in-phase components are identical to each other are coupled to each other, thereby forming a single antenna group.

In this case, where are employed a plurality of unit antenna units which are made of at least one unit antenna arranged within such an electromagnetic wave propagating range that the phases of the received waves become in-phase components. A plurality of unit antenna units are alternately arranged adjacent to each other in such a manner that the in-phase components for constituting the major components waves in the mutually adjacent unit antenna units are different from each other.

In the examples of FIGS. 20 and 29, the antenna is arranged by a unit antenna group 1M and a unit antenna group 1N*t*. The unit antenna group 1M is constructed of a large number of unit antennas 1*m* each having the same directivity, in which the phase of the wave propagation of the antenna is present in the range of the in-phase component. The unit antenna group 1N*t* is arranged by a large number of unit antennas 1*n* each having the same directivity, in which the phase of the wave propagation of the antenna is present in the range of the in-phase component. As to the unit antenna 1*m* and the unit antenna 1*n*, the in-phase components for constituting the directivity and the received electromagnetic waves (wave propagation) are mutually different. For instance, the unit antenna 1*n* and the unit antenna 1*n* are alternately arranged with an interval smaller than 2λ, preferably.

Furthermore, a relative setting angle "α*n*" (see FIG. 32A) of directivity of adjoining unit antennas for constituting the same group is different from each other, depending upon curves of the travel surface. Normally, this relative setting angle "αn" is set to +45 degrees and −45 degrees, preferably +30 degrees and −30 degrees, and 0 degree (travel surface is straight) under optimal condition.

Figure 32A:
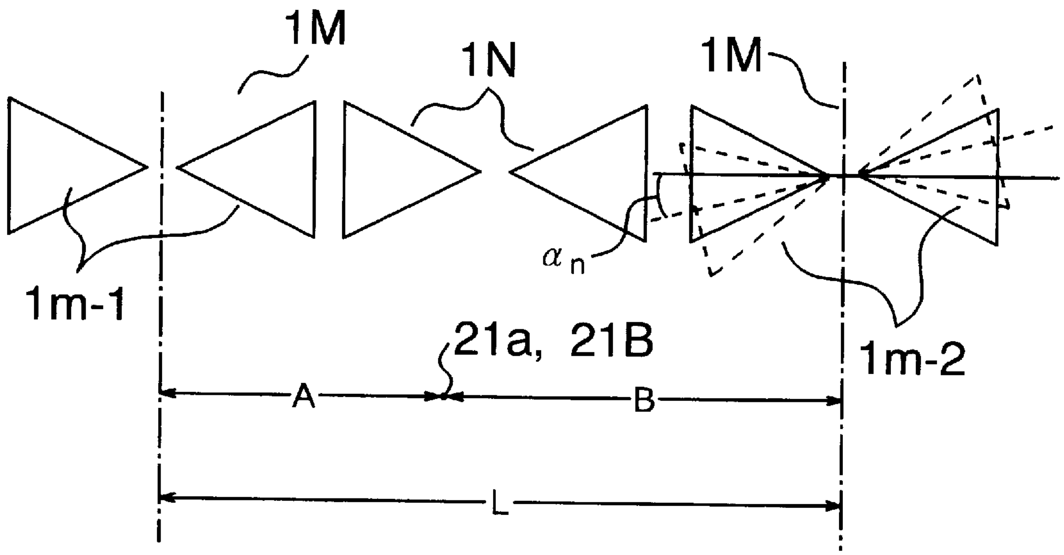
FIG. 32A and FIG. 32B and plan views for indicating an example that the unit antennas of the multi-antenna are installed in FIG. 28 and FIG. 29.
Figure 32B:
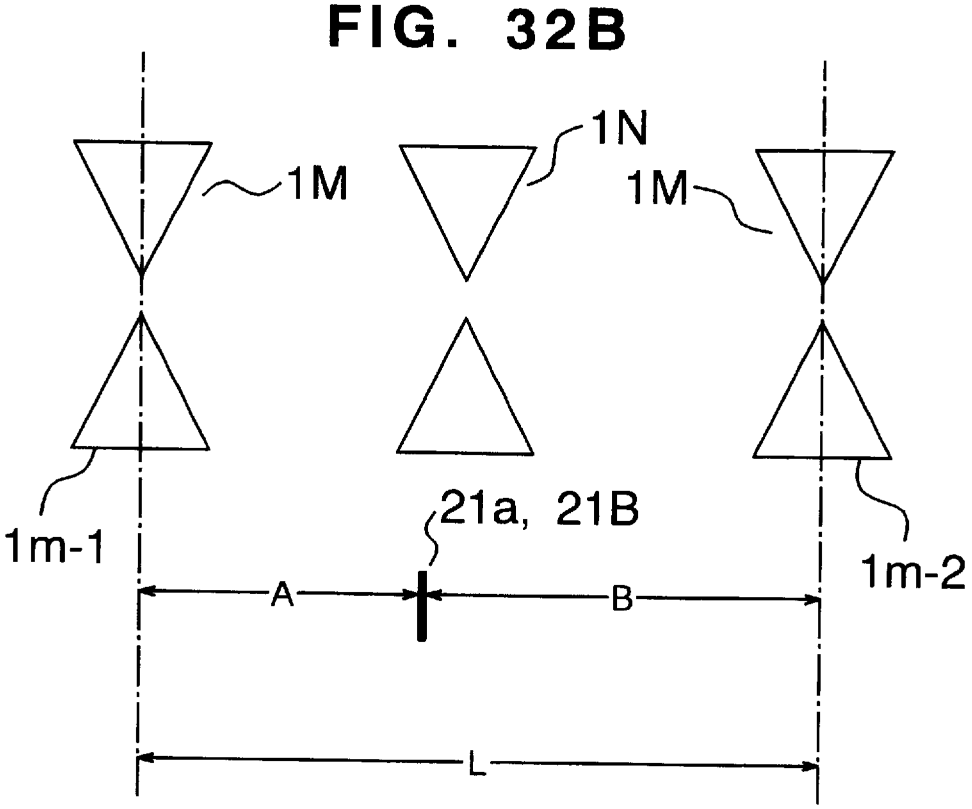

FIG. 32A and FIG. 32B are plane views for indicating arrangements of unit antennas belonging to the same group. In FIG. 32A, the unit antenna 1*m*-2 indicated by a broken line is set to the unit antenna 1*m*-1 under such a condition that the angle "αn" is selected to be about 10 degrees.

Figure 30:
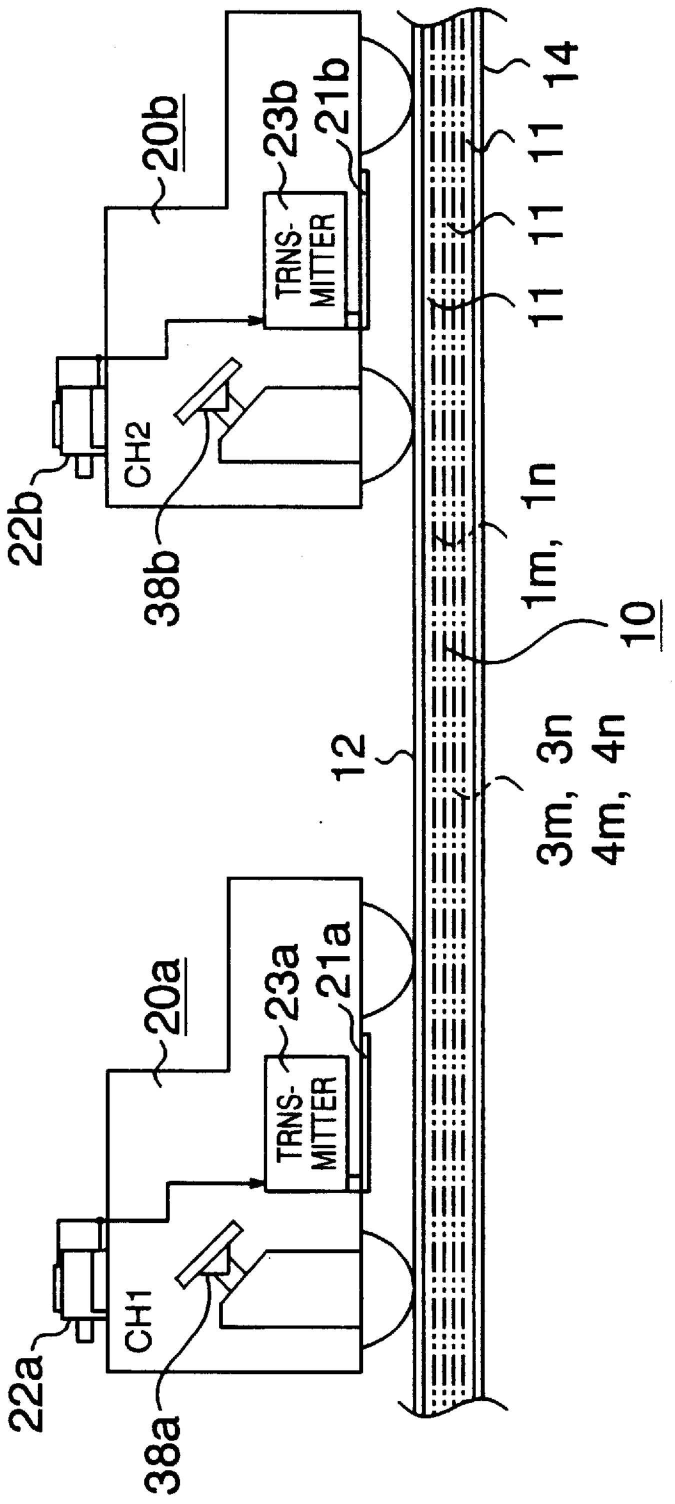
FIG. 30 is a side view for indicating a structural example of the mobile station and the plane multi-antenna provided at the fixed station in FIG. 28 and FIG. 29.

FIG. 30 is a side view for illustrating a positional relationship among the respective moving objects corresponding to the mobile station, the antennas thereof, and a multi-antenna 100 provided on the fixed station side shown in FIGS. 28 to 29.

In FIG. 30, as one example, similar to the respective embodiments, the plane multi-antenna 100, the feeder and the coaxial cable are arranged via either a space or dielectric 11 on a shield ground plate 14, but these components other than the antenna may be positioned under the shield ground plate 14. Reference numeral 12 is a travel plate having a travel surface along which the respective mobile stations 20*a* and 20*b* are traveled.

Figure 31:
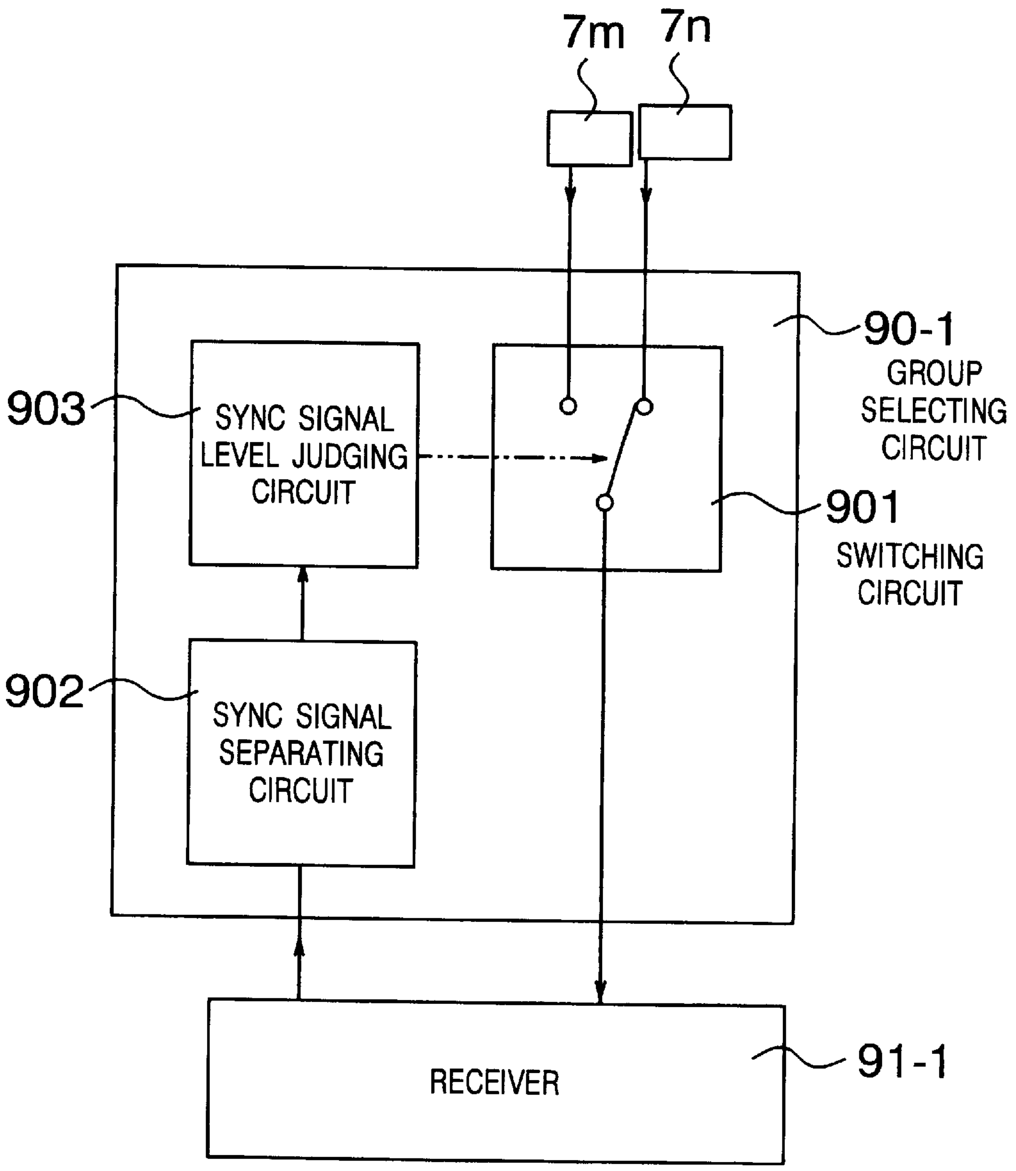
FIG. 31 is a schematic block diagram for indicating a structural example of the group selecting circuit 90 shown in FIG. 28 and FIG. 29.

FIG. 31 is a block diagram for showing an arrangement of the group selecting circuit 90 which corresponds to the channel CH1. For instance, the antenna outputs from the two unit antenna groups 1N and 1M of the multi-antenna, whose antenna phases are different from each other, are entered to the switching circuit 90-1. Since operation of the group selecting circuit 90 shown in FIG. 31 is the same as that of FIG. 25, no explanation thereof is made.

With this arrangement, the output from the unit antenna group 1M or 1N is continuously selected to be supplied to the receiver 91-1, which has the high level of the picture signal.

FIGS. 32A and 32B represent unit antennas belonging to the same group, i.t., group 1M in this case. FIG. 32A corresponds to FIG. 28, and FIG. 32B corresponds to FIG. 29. As shown in FIG. 32A, generally speaking, assuming now that a distance between the adjoining unit antennas 1*m*-1, 1*m*-2, belonging to the same group is "L", another distance between the antenna 21*a* or 21*b* of the mobile station, and the unit antenna 1*m*-1 is "A", and other distance between the antenna 21*a*, or 21*b* of the mobile station and the unit antenna 1*m*-2 is "B", as to the phases and the output difference of the signals received from the antenna 21*a* or 21*b* of the mobile station to the unit antennas 1*m*-1 and 1*m*-2, the in-phase state is established in case of the phase difference "λ", and the outputs of the reception levels by the distances A and B of the antennas of the mobile station and the fixed station are summed.

When the distance "L" between the unit antennas, for instance, belonging to the same group is set in a manner that the phase difference therebetween becomes λ/2, the phases of the signals received between the unit antennas 1*m*-1 and 1*m*-2 are completely opposite to each other, and the output from the multi-antenna becomes an output difference in the reception levels between these unit antennas, depending upon the distances A and B of the unit antennas 1*m*-1 and 1*m*-2, namely the output becomes very small.

When the distance between the antennas 1*m*-1 and 1*m*-2 is defined by $L \approx 2\lambda$, at a position where the distance A between the antenna of the mobile station and the unit antenna 1*m*-1 is defined by $A \approx 3\lambda/4$, and the distance B between the antenna of the mobile station and the unit antenna 1*m*-2 is defined by $B \approx 5\lambda/4$, then $B-A=\lambda/2$. Similarly, at a position where $A \approx 5\lambda/4$ and $B \approx 3\lambda/4$, then $A-B=\lambda/2$ (actually, it is not plane, but three-dimensional, and also is not a straight line. However, the idea is basically identical).

In other words, the adjoining unit antennas mutually connected to the same group receive the electronic waves having the completely opposite phases.

That is, a plurality of unit antenna units are alternately arranged adjacent to each other, which are constructed of at least single unit antenna existing in an electromagnetic wave propagation range that in-phase components of the received electromagnetic waves become major components, and the in-phase components of the received electromagnetic waves in the mutually adjacent unit antenna units are different from each other.

Furthermore, when each of the mobile stations 20*a* and 20*b* is traveled in a linear form on the travel surface 12 along a predetermined direction, within such a range that the antenna outputs are summed at the substantially same phases of the electromagnetic waves transmitted/received by the group 1M of the plane multi-antenna 10, the output signal having the better quality is selected from the group 1M by the group selecting circuit 90 of the fixed station 9, and the selected output signal can be inputted to the receiver 91.

Within such a range that the antenna outputs are summed at the substantially same phases of the electromagnetic waves transmitted/received by the group 1N of the plane multi-antenna 10, the output signal with the better quality from the group 1N is selected, and can be entered into the receiver 91. With such a structure, the picture information having the wide bandwidth can be effectively radio-transmitted under small power, very small power by the simple structure manufactured at low cost. Also, the mobile station is not always traveled in a linear form along the travel surface, but may be traveled along a curved travel surface. Even under such a curved surface, correspondence between the phase output and the propagation surface of the electronic waves among the antennas is selectively performed, so that the signals with better quality can be continuously transmitted. Furthermore, when the mobile station is traveled in a linear form along the longitudinal direction of the travel surface, the signal with the better quality can be continuously transmitted.

The embodiments shown in FIG. 28 and FIG. 29 are such embodiment that the information is transmitted from the mobile station to the fixed station along one direction. Then, an embodiment about a bidirectional communication will now be explained.

Figure 33:
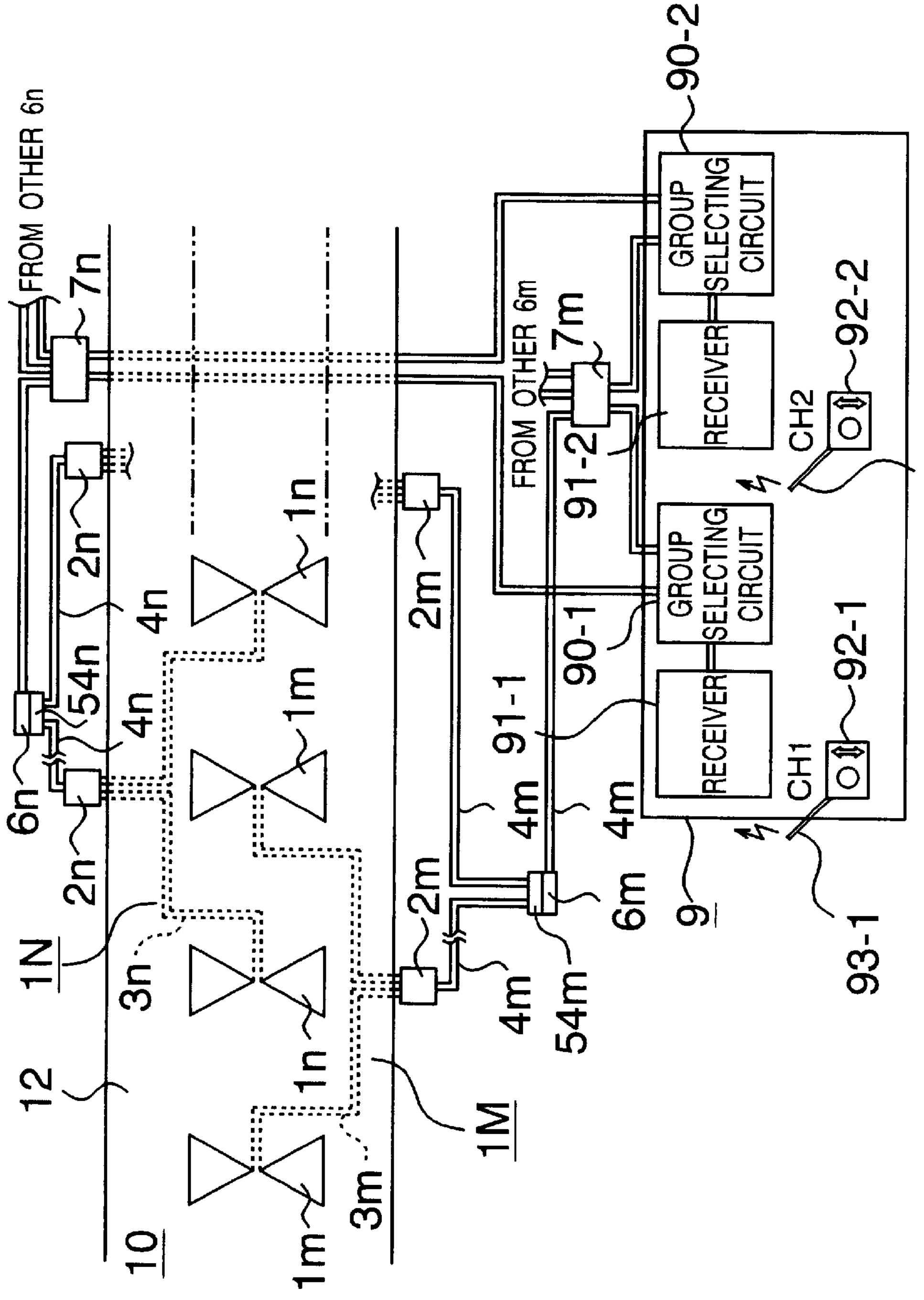
FIG. 33 is a schematic block diagram for representing an overall arrangement of such an information transmitting system that the information transmitting system is operable in the bidirectional communication mode, according to a still further embodiment of the present invention.
Figure 34:
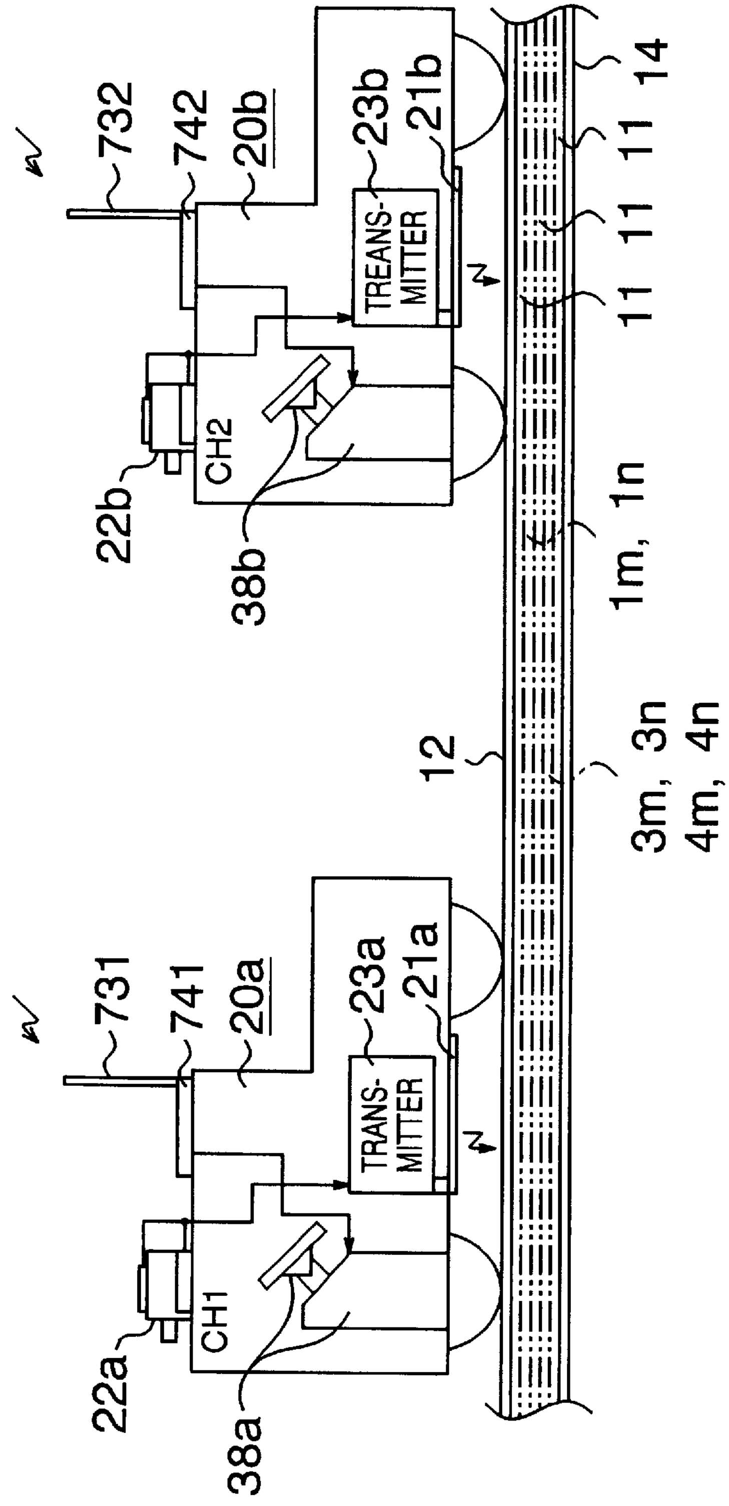
FIG. 34 is a side view for denoting a structural example of the mobile station and the plane multi-antenna provided on the fixed station shown in FIG. 33.

FIG. 33 shows an arrangement of a system according to an embodiment, in which in addition to the picture information transmitting system from the mobile station to the fixed station within the arrangement of FIG. 29, a control signal is transmitted from the fixed station to the mobile station. FIG. 34 represents an arrangement of this mobile station. These arrangements are similar to those of FIGS. 26 and 27, and explanations thereof are omitted.

As described above, since at least two antenna groups 1M and 1N of the plane multi-antennas are employed, the picture information can be transmitted from the mobile station to the fixed station under stable condition, and furthermore the data information such as the control signals can be transmitted/received from the fixed station to the mobile station, which is related to the picture information. It should be noted that this embodiment is also applied to the embodiment shown in FIG. 28.

Such an information transmitting system may be utilized in a system that, for example, information is sent/received between an elevator car (mobile station) and an elevator control monitoring apparatus. It should be noted that the mobile station is not always traveled in a linear form along the travel surface, but may be traveled along the direction perpendicular to the longitudinal direction so as to escape from interference. In accordance with this embodiment, the antenna group received by the fixed station is selected, so that while the signal having the better quality can be continuously received, the travel direction and the travel speed of the mobile station can be controlled based on the data information such as the control signal. As a consequence, as the actual example of the moving object shown in FIG. 34, a load carrying car and a radio-controlled robot are optimum.

The bandwidths of the picture information transmission frequency are different from each other with respect to the carrier wave, depending upon the modulation system. When the FM system is employed, the wider the bandwidth becomes, the better the S/N ratio is achieved. By this FM system, more effective picture information transmission is available as to the surrounding noise, for instance, the transmission bandwidth is selected to be higher than, or equal to approximately 6 MHz. When the travel surface becomes for distance, the plane multi-antenna 10 is subdivided into such blocks as shown in FIG. 23 to constitute a hierarchical structure, so that adverse influences caused by noise and interference can be suppressed.

It should be noted that each of the mobile stations may modulate such information related to a video (picture) of a television camera, for instance, sound information, or positional information of a GPS (global positioning system by satellite) and thereafter may transmit the modulated signal (generally speaking, modulating operation of a modulator employed in a transmitter is normal).

In accordance with the embodiment shown in FIGS. 19 to 34, there are the following effects other than the effects achieved in the embodiments of FIGS. 1 to 18. That is, the picture information with the wide bandwidth can be easily, simply obtained as the picture information with better qualities and the acquired relative information at any positions, while the antenna of the mobile station is continuously located opposite to the antenna of the fixed station. In particular, even when the mobile station is traveled in any travel directions, signal disturbances and deterioration in the S/N radio can be relatively reduced to be negligible low. These signal disturbances and S/N deterioration are caused by the phase shifts, while maintaining the better image quality level. As the better picture information and the related information, even where the mobile station is present, the antennas of the mobile station and the fixed station are positioned opposite to each other, so that constant information can be simply, easily obtained.

It should be noted that although the transmission channel from the mobile station and the transmission channel from the fixed station are different from each other in such an embodiment that the information is transmitted between the mobile station and the fixed station in the bidirectional manner, the time-divisional multiplex system and the speed spectrum communication system may be employed with using the same channel.

Also, in the embodiments of FIG. 33 and FIG. 34, the structure thereof is constructed in a similar manner to that of FIG. 16 and FIG. 17, so that the antennas 21*a*, 21*b* and the antenna groups (1M, 1N) may be commonly used to transmit/receive the picture information and/or other information.

What is claimed is:

1. An information transmitting system comprising:

a mobile station moved within a predetermined moving range;

an antenna apparatus including a large number of unit antennas which are mutually connected to each other, and are arranged along the moving range of said mobile station;

a fixed station connected to said antenna apparatus, for receiving information via said antenna apparatus by way of a radio transmission between said mobile station and said fixed station; and wherein said antenna apparatus is designed in such a manner that a plurality of said unit antennas are arranged at a shape of at least two arrays along a direction perpendicular to a longitudinal direction of a travel path along the moving range of said mobile station, and said two arrays of unit antennas are arranged in such a manner that said unit antennas are mutually shifted along the longitudinal direction of said travel path.

2. An information transmitting system comprising:

a mobile station moved within a predetermined moving range;

an antenna apparatus including a large number of unit antennas which are mutually connected to each other, and are arranged along the moving range of said mobile station;

a fixed station connected to said antenna apparatus, for receiving information via said antenna apparatus by way of a radio transmission between said mobile station and said fixed station; and shield plates arranged in a plane condition along the moving range of said mobile station; wherein:

said large number of unit antennas are so arranged in a plane condition on one surface of said shield plates that a predetermined interval is defined between said unit antennas and said shield plate.

3. An information transmitting system as claimed in claim 2, further comprising:

travel plates arranged in a plane condition and located opposite to said shield plates via said large number of unit antennas along the moving range of said mobile station.

4. An information transmitting system as claimed in claim 2, further comprising:

dielectrics provided between said large number of unit antennas and said shield plates, and also among said unit antennas, wherein:

said large number of unit antennas and said shield plates are made in an integral form by said dielectrics.

5. An information transmitting system comprising:

a mobile station moved within a predetermined moving range;

an antenna apparatus including a large number of unit antennas which are mutually connected to each other, and are arranged along the moving range of said mobile station; and a fixed station connected to said antenna apparatus, for receiving information via said antenna apparatus by way of a radio transmission between said mobile station and said fixed station;

wherein said large number of unit antennas are arranged at any one of an interior portion of a travel path on which said mobile station is traveled, and which are located along the moving range of said mobile station;

an inside of a ceiling along the travel path;

a side wall along the travel path;

said large number of unit antennas are arranged inside said side wall;

said mobile station includes an antenna for radio-transmitting the information between said antenna apparatus and said mobile station; and said antenna of the mobile station is arranged in parallel to said antenna apparatus and also perpendicular to said travel path.

6. An information transmitting system comprising:

a mobile station moved within a predetermined moving range, including a first transmitter, a first receiver, and antenna means connected to said first transmitter and said first receiver, for transmitting/receiving information between a fixed station and said mobile station;

an antenna apparatus including a large number of unit antennas which are mutually connected to each other, and are arranged along the moving range of said mobile station; and a fixed station connected to said antenna apparatus, for transmitting/receiving information via said antenna apparatus by way of a radio transmission between said mobile station and said fixed station;

wherein said fixed station includes a second receiver for receiving the information from said antenna means of the mobile station, and a second transmitter for transmitting the information to said mobile station by way of the radio transmission;

wherein said mobile station further includes a first shared device, and said antenna means is connected via the first shared device to said first transmitter and said first receiver; and said fixed station further includes a second shared device, and said second receiver and said transmitter are connected via said second shared device to said antenna apparatus;

whereby information from the first transmitter of said mobile station is received by the second receiver via said first shared device, said antenna means through said antenna apparatus, and said shared device of the fixed station; and information from the second transmitter of said fixed station is received by the first receiver via the second shared device through the antenna apparatus, and the antenna means of said mobile station.

7. An information transmitting system as claimed in claim 6 wherein:

said mobile station includes a picture information output apparatus for outputting picture (video) information as said information;

said mobile station radio-transmits the picture information derived from said picture information output apparatus from said first transmitter via said antenna means; and said second receiver of the fixed station receives the picture information via said antenna apparatus.

8. An information transmitting system as claimed in claim 6 wherein:

said unit antennas of the antenna apparatus are arranged in a plane condition along the moving range of the mobile station.

9. An information transmitting system comprising:

a mobile station moved within a predetermined moving range, including a first transmitter, a first receiver, and antenna means connected to said first transmitter and said first receiver, for transmitting/receiving information between a fixed station and said mobile station;

an antenna apparatus including a large number of unit antennas which are mutually connected to each other, and are arranged along the moving range of said mobile station; and a fixed station connected to said antenna apparatus, for transmitting/receiving information via said antenna apparatus by way of a radio transmission between said mobile station and said fixed station;

wherein said fixed station includes a second receiver for receiving the information from said antenna means of the mobile station, and a second transmitter for transmitting the information to said mobile station by way of the radio transmission; and wherein said antenna means of said mobile station includes a first antenna connected to said first transmitter, and a second antenna connected to said first receiver;

an said fixed station includes a third antenna connected to the second transmitter and said second receiver is connected to said antenna apparatus;

whereby information from the first transmitter of said mobile station is received from said antenna means via said antenna apparatus by the second receiver of the fixed station; and information from the second transmitter of said fixed station is received via said third antenna by the second antenna of the mobile station, to thereby be received by the first receiver.

10. An information transmitting system comprising:

a mobile station moved within a predetermined moving range, including a first transmitter, a first receiver, and antenna means connected to said first transmitter and said first receiver, for transmitting/receiving information between a fixed station and said mobile station;

an antenna apparatus including a large number of unit antennas which are mutually connected to each other, and are arranged along the moving range of said mobile station; and a fixed station connected to said antenna apparatus, for transmitting/receiving information via said antenna apparatus by way of a radio transmission between said mobile station and said fixed station;

wherein said fixed station includes a second receiver for receiving the information from said antenna means of the mobile station, and a second transmitter for transmitting the information to said mobile station by way of the radio transmission;

said mobile station includes a picture information output apparatus for outputting picture (video) information as said information;

said mobile station radio-transmits the picture information derived from said picture information output apparatus from said first transmitter via said antenna means; and said second receiver of the fixed station receives the picture information via said antenna apparatus;

wherein the second transmitter of said fixed station outputs as said information, travel control information used to control travels of said mobile station; and said mobile station further includes travel control means for controlling a travel condition of said mobile station, and said first receiver receives said travel control information derived from said fixed station via said antenna means and supplies said travel control information to said travel control means.

11. An antenna apparatus comprising:

a plurality of antenna unit groups, each of which is formed by a plurality of unit antenna units;

wherein:

each of said unit antenna units is constructed of at least one unit antenna;

shapes of electromagnetic waves irradiated from each unit antenna employed within first antenna unit groups are substantially identical to each other;

shapes of electromagnetic waves irradiated from each unit antenna employed within second antenna unit groups are different from one of said first antenna unit groups;

said first antenna unit groups and said second antenna unit groups are alternately arranged in such a manner that said first antenna unit groups are placed adjacent to said second antenna unit groups; and the unit antennas belonging to the same antenna unit groups are commonly connected to each other.

12. An antenna apparatus as claimed in claim 11 wherein:

a quantity of said unit antenna unit groups is 2; and the shapes of the electromagnetic waves irradiated from the unit antennas belonging to one group of said two antenna unit groups are shifted within an angle range between 45 and 135 degrees with respect to those of the other group thereof.

13. An information transmitting system comprising:

a mobile station moved within a predetermined moving range;

an antenna apparatus including a large number of unit antennas which are mutually connected to each other, and are arranged along the moving range of said mobile station; and a fixed station connected to said antenna apparatus, for transmitting/receiving information via said antenna apparatus by way of a radio transmission between said mobile station and said fixed station;

said antenna apparatus being comprised of a plurality of antenna unit groups, each of which is formed by a plurality of unit antenna units; wherein:

each of said unit antenna units is constructed of at least one unit antenna;

shapes of electromagnetic waves irradiated from each unit antenna employed within first antenna unit groups are substantially identical to each other;

shapes of electromagnetic waves irradiated from each unit antenna employed within second antenna unit groups are different from one of said first antenna unit groups;

said first antenna unit groups and said second antenna unit groups are alternately arranged in such a manner that said first antenna unit groups are placed adjacent to said second antenna unit groups; and the unit antennas belonging to the same antenna unit groups are commonly connected to each other.

14. An information transmitting system as claimed in claim 13 wherein:

said mobile station includes an antenna for radio-transmitting information between said antenna apparatus and said mobile station; and a distance between the antenna of said mobile station and said antenna apparatus is shorter than, or equal to 5λ (symbol "λ" being a wavelength of an electromagnetic wave used to radio-transmit information).

15. An information transmitting system as claimed in claim 14 wherein:

said distance between the antenna of the mobile station and the antenna apparatus is shorter than, or equal to 5λ, and also longer than, or equal to λ/50.

16. An information transmitting system as claimed in claim 13 wherein:

a field strength of the electromagnetic wave transmitted from the mobile station to the fixed station is lower than, or equal to 500 $\mu$V/m in the case that the distance between the mobile station and the antenna apparatus is selected to be 3 m.

17. An information transmitting system as claimed in claim 13 wherein:

said unit antennas of the antenna apparatus are arranged in a plane condition along the moving range of the mobile station.

18. An information transmitting system as claimed in claim 17 wherein:

each of said unit antennas of the antenna apparatus is a plane antenna.

19. An information transmitting system as claimed in claim 13 wherein:

said mobile station includes a picture information output apparatus for outputting picture (video) information as said information;

said mobile station radio-transmits the picture information derived from said picture information output apparatus; and said fixed station receives the picture information via said antenna apparatus.

20. An information transmitting system as claimed in claim 13 wherein:

said fixed station includes:

a group selecting circuit connected to a plurality of antenna unit groups of said antenna apparatus, for comparing information outputs with each other received from said plurality of antenna unit groups of said antenna apparatus, transmitted from said transmitter, whereby said group selecting circuit selects the information output of the unit antenna unit group having the highest reception output; and a receiver for receiving the selection output from said group selecting circuit.

21. An information transmitting system as claimed in claim 13 wherein:

said mobile station includes a first transmitter, a first receiver, and antenna means connected to said first transmitter and said first receiver, for transmitting/receiving information between a fixed station and said mobile station; and said fixed station includes a second receiver for receiving the information from said antenna means of the mobile station, and a second transmitter for transmitting the information to said mobile station by say of the radio transmission.

22. An information transmitting system comprising:

a mobile station moved within a predetermined moving range;

an antenna apparatus including a large number of unit antennas which each functions as an antenna, are mutually connected to each other, and are arranged along the moving range of said mobile station; and a fixed station connected to said antenna apparatus, for transmitting/receiving information via said antenna apparatus by way of a radio transmission between said mobile station and said fixed station;

said antenna apparatus being comprised of:

a plurality of unit antenna unit groups, each of which groups being formed by a plurality of unit antenna units; wherein:

each of said unit antenna units is constructed of at least one unit antenna;

the respective unit antennas employed within said respective unit antenna units of the same unit antenna unit group are arranged in such an electromagnetic wave propagation range that phases of the electromagnetic waves received by said respective unit antennas own the substantially in-phase wave components as a major wave component thereof;

the major in-phase components of the electromagnetic waves received by said plurality of unit antenna groups are different from each other every unit antenna groups;

said plurality of unit antenna units are alternately arranged in such a manner that the unit antenna units adjacent to each other belong to the unit antenna unit group different thereof; and the unit antennas of the unit antenna unit belonging to the same unit antenna unit group are commonly connected to each other.

23. An information transmitting system as claimed in claim 22 wherein:

said mobile station includes an antenna for radio-transmitting information between said antenna apparatus and said mobile station; and a distance between the antenna of said mobile station and said antenna apparatus is shorter than, or equal to 5λ, (symbol "λ" being a wavelength of an electromagnetic wave used to radio-transmit information).

24. An information transmitting system as claimed in claim 23 wherein:

said distance between the antenna of the mobile station and the antenna apparatus is shorter than, or equal to 5λ, and also longer than, or equal to λ/50.

25. An information transmitting system as claimed in claim 22 wherein:

a field strength of the electromagnetic wave transmitted from the mobile station to the fixed station is lower than, or equal to 500 $\mu$V/m in the case that the distance between the mobile station and the antenna apparatus is selected to be 3 m.

26. An information transmitting system as claimed in claim 22 wherein:

said unit antennas of the antenna apparatus are arranged in a plane condition along the moving range of the mobile station.

27. An information transmitting system as claimed in claim 26 wherein:

each of said unit antennas of the antenna apparatus is a plane antenna.

28. An information transmitting system as claimed in claim 22 wherein:

said mobile station includes a picture information output apparatus for outputting picture (video) information as said information;

said mobile station radio-transmits the picture information derived from said picture information output apparatus; and said fixed station receives the picture information via said antenna apparatus.

29. An information transmitting system as claimed in claim 22 wherein:

said fixed station includes:

a group selecting circuit connected to a plurality of unit antenna unit groups of said antenna apparatus, for comparing information outputs with each other received from said plurality of antenna unit groups of said antenna apparatus, transmitted from said transmitter, whereby said group selecting circuit selects the information output of the unit antenna unit group having the highest reception output; and a receiver for receiving the selection output from said group selecting circuit.

30. An information transmitting system as claimed in claim 22 wherein:

said mobile station includes a first transmitter, a first receiver, and antenna means connected to said first transmitter and said first receiver, for transmitting/receiving information between a fixed station and said mobile station; and said fixed station includes a second receiver for receiving the information from said antenna means of the mobile station, and a second transmitter for transmitting the information to said mobile station by say of the radio transmission.

31. An information transmitting system as claimed in claim 22 wherein:

a difference in directions of directivity of the unit antennas belonging to the same group of said antenna apparatus is smaller than, or equal to 45 degrees.

* * * * *